US007237240B1

(12) United States Patent
Chen et al.

(10) Patent No.: US 7,237,240 B1
(45) Date of Patent: Jun. 26, 2007

(54) MOST USED PROGRAMS LIST

(75) Inventors: Raymond J. Chen, Redmond, WA (US); Sam Leventer, Seattle, WA (US); Sankar Ramasubramanian, Redmond, WA (US); John E. Schussler, Redmond, WA (US); Richard W. Stoakley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 664 days.

(21) Appl. No.: 10/180,685

(22) Filed: Jun. 24, 2002

Related U.S. Application Data

(60) Provisional application No. 60/335,809, filed on Oct. 30, 2001.

(51) Int. Cl.
*G06F 9/46* (2006.01)
*G06F 15/177* (2006.01)
*G06F 7/00* (2006.01)
(52) U.S. Cl. ............................ 718/100; 709/222; 707/1
(58) Field of Classification Search ................ 707/203, 707/1; 709/222, 203; 718/100
See application file for complete search history.

(56) References Cited

U.S. PATENT DOCUMENTS

| | | | | |
|---|---|---|---|---|
| 5,021,948 A | * | 6/1991 | Nakayama et al. ............ 703/22 |
| 5,539,870 A | * | 7/1996 | Conrad et al. ................ 715/810 |
| 5,757,371 A | | 5/1998 | Oran et al. |
| 5,796,989 A | * | 8/1998 | Morley et al. ................. 703/26 |
| 6,121,968 A | | 9/2000 | Arcuri et al. |
| 6,133,915 A | | 10/2000 | Arcuri et al. |
| 6,148,294 A | * | 11/2000 | Beyda et al. .................... 707/1 |
| 6,151,707 A | * | 11/2000 | Hecksel et al. .............. 717/178 |
| 6,229,539 B1 | | 5/2001 | Morcos et al. |
| 6,246,409 B1 | | 6/2001 | Veghte et al. |
| 6,324,546 B1 | * | 11/2001 | Ka et al. ...................... 707/203 |
| 6,535,915 B1 | * | 3/2003 | Valys et al. .................. 709/222 |

OTHER PUBLICATIONS

Jewell, D., "Windows shell secrets: the MRU list," EXE, vol. 13, No. 9, pp. 35, 37-38, 40, 43, 45, Centaur Communications, Feb. 1999.
Ding, Z., "Managing window workspaces in MDI," Windows Developers Journal, vol. 10, No. 9, pp. 33-40, Miller Freeman, Sep. 1999.

* cited by examiner

*Primary Examiner*—Meng-Al T. An
*Assistant Examiner*—Camquy Truong
(74) *Attorney, Agent, or Firm*—Christensen O'Connor Johnson Kindness PLLC

(57) ABSTRACT

The present invention provides a system and method for dynamically populating a list of most used execution points in a graphical user interface of an operating system based upon the utilization behavior of a user. One embodiment provides for depicting a list of execution points to most used programs by determining a list of eligible programs, tracking the usage of the eligible programs in a usage list, taking into account chronological order of the activation of the programs and determining which programs in the usage list have the most usage. These programs then have execution points placed on a displayed most used list in the graphical user interface.

78 Claims, 17 Drawing Sheets

MOST USED PROGRAMS LIST

CROSS-REFERENCE TO A RELATED APPLICATION

This application claims the benefit of U.S. Provisional Application No. 60/335,809 filed on Oct. 30, 2001, and entitled PRESENTING MOST FREQUENTLY USED PROGRAMS TO USERS.

FIELD OF THE INVENTION

This invention generally relates to computer program user interfaces and, more specifically, to a dynamically populated list of programs executed in a computer operating system.

BACKGROUND OF THE INVENTION

In recent years, worldwide use of computers has increased dramatically. Computer application programs ("programs") are used for a variety of purposes including word processing, accounting, database management, desktop publishing, communications, and the like. The efficiency of computer utilization is improved by allowing a user to easily access a variety of different programs directed to accomplishing tasks and fulfilling the various goals of the user. For example, an accountant might make regular and extensive use of a word processing program, an e-mail program, a spreadsheet program, and a personal information manager. In addition, at certain times of the year, the accountant may use a tax preparation program. Rather than being used regularly throughout the year, the tax preparation program is only used frequently for a few months and is then discarded as outdated due to changes in the tax laws.

Accessing and executing programs is typically accomplished by selecting icons from a desktop, selecting an executable program directly from a directory of files, selecting a program from a listing of programs installed on the computer, or selecting a program from any of a variety of easy-to-access locations on an operating system user interface.

Some operating systems allow the user to customize program "execution points" (shortcuts, links, and other possible places to execute a program). For example, icons that access a specific program can be placed on a task bar or a desktop space. Such customization allows the advanced user to add execution points for programs that the user wants to quickly access and to remove execution points for programs the user no longer wants to quickly access. The placement and removal of icons related to execution points is normally done through a "drag and drop" process or through the operation of a dialog box or menu to add or delete execution points to particular programs. If a user desires to retrieve a deleted execution point, the user must search for the desired program and add an icon to the appropriate place from which the user desires to access the program. Customizing operating system execution points can be a complicated and confusing task. Unfortunately, most users lack the sophistication to perform execution point customizations. In many cases users will not delete a current execution point because they may need to access the related program in the future and are afraid that they may not be able to access the program if the execution point is deleted. As a result, execution point lists become longer and longer, making more frequently used programs more time consuming and difficult to access.

Therefore, a need exists for a new and improved method for assisting users in prioritizing execution points in a way that improves the accessibility of execution points associated with frequently used programs.

SUMMARY OF THE INVENTION

In accordance with the present invention, a system, method, and computer readable medium for dynamically populating a list of execution points in a graphical user interface of an operating system based upon the program utilization behavior of a user are provided.

In accordance with one aspect of the present invention, the list of execution points is determined by tracking the usage of eligible programs, taking into account the chronological order of program activation, and the rate of program usage. The execution points highest in the list are displayed in the graphical user interface.

In accordance with another aspect of the present invention, eligible programs do not include directories and/or programs that are specifically excluded from being included. Preferably, programs that have been placed in positions of prominence manually by the user, such as on a status bar or on a pinned list, are not eligible programs.

In accordance with yet another aspect of the present invention, the determination of which programs are most used takes place contemporaneously with the request to display a list of execution points, at periodic intervals or when program usage value changes are detected.

In accordance with still further aspects of the present invention, decreases or aging of usage values occur in intervals measured in usage "sessions" as opposed to time. Aging usage values based on usage sessions rather than time allows a user to leave their computer on, but unused, for extended periods of time without usage values being altered. Aging of usage values based on usage sessions rather than time also allows a user to turn their computer off for extended periods of time, again without usage values being altered.

In accordance with still further aspects of the present invention, the usage values of programs are tracked on a per user basis as opposed to an overall basis for all users of a particular program running on a computer.

As will be readily appreciated, the foregoing summary of the invention provides a new and improved method of assisting users by prioritizing execution points in a way that improves the accessibility of execution points associated with frequently used programs, and a related system and computer readable medium.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a method, system, and computer readable medium for tracking the use of programs and displaying a "most used" programs list on an operating system's graphical user interface. The more often a user executes ("uses") a particular program, the more likely that program is to appear on the displayed program list.

As will be discussed below, the present invention dynamically determines which programs will be included in the most used programs list.

As will be further understood from the following description, preferably, an initial most used programs list is provided by the operating system. Such a list contains a set of execution points for programs predefined by the operating system provider and/or computer system provider. When a user desires to execute a particular program not included in the initial most used programs list, the user executes the program using any conventional execution point, such as "clicking" on an icon displayed in a window that includes all or a specific set of programs installed on the computer. After a user selects a particular program a sufficient number of times, an execution point for the program is dynamically added to the most used programs list and displayed to reflect the active usage.

The present invention provides for monitoring the usage of the programs included in the most used programs list. In one embodiment of the invention, each time the user requests that the list of most used programs be displayed, a "real time" analysis of the user's previous usage of programs is conducted. As the user's usage of programs changes, the change is dynamically reflected in the most used programs list. In an alternate embodiment of the invention, the user's usage patterns of programs is periodically analyzed and the most used programs list is updated based on the analysis. Preferably, the user's usage of programs is maintained in a data structure that is compact and efficient, and uses a small amount of memory space and processing time when analyzing the contents of the data structure.

Figure 1:
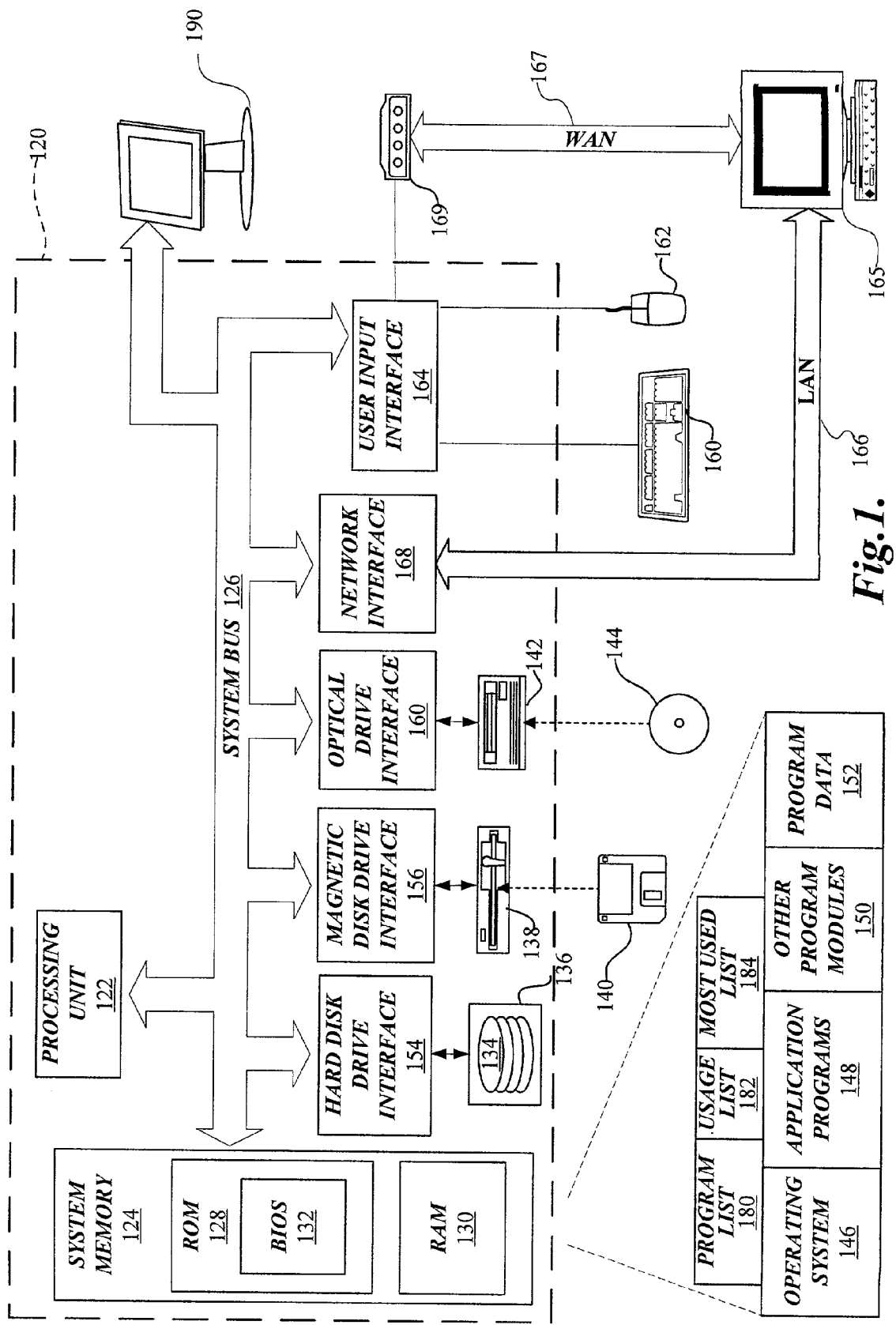
FIG. 1 is a block diagram of a personal computer that provides an exemplary operating environment for an embodiment of the present invention.

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network. FIG. 1 illustrates an example of a suitable computing system environment in which the invention may be implemented. The computing system environment shown in FIG. 1 is only one example of a suitable computing environment and is not intended to suggest any limitation as to the scope of use or functionality of the invention. Neither should the computing environment be interpreted as having any dependency requirement relating to any one or a combination of components illustrated in the exemplary operating environment.

The invention is operational in numerous general purpose or special computing system environments or configurations. Examples of well known computing systems, environments, and/or configurations that may be suitable for implementing the invention, include, but are not limited to, personal computers, server computers, laptop devices, multiprocessor systems, microprocessor-based systems, network PC's, mini-computers, mainframe computers, and distributed computing environments that include any of the above systems, or the like.

The invention may be described in the general context of computer-executable instructions, such as program modules, being executed by a computer. Generally, program modules include routines, programs, objects, components, data structures, etc. that perform a particular task or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 120. Components of the computer 120 include, but are not limited to, a processing unit 122, a system memory 124, a display 190, and a system bus 126 that couples various system components including the system memory 124 to the processor 122. The system bus 125 may be any of several types of bus structures including a memory bus or memory controller, peripheral bus, or a local bus using any of a variety of bus architectures. By way of example, and not limitation, such architectures include industry standard architecture ("ISA") bus, microchannel architecture ("MCA") bus, enhanced ISA ("EISA") bus, video electronic standards association ("VESA") local bus, peripheral component interconnect ("PCI") bus, also known as mezzanine bus, and accelerated graphics port ("AGP") bus.

The computer 120 typically includes a variety of computer-readable media. Computer-readable media can be any available media that can be accessed by the computer 120 and include both volatile and non-volatile media, and removable and non-removable media. By way of example, and not limitation, computer-readable media may comprise computer storage media and communication media. Computer storage media includes, but is not limited to, RAM, ROM, EEPROM, flash memory or other memory technology, CD-ROM, digital versatile disc ("DVD") or other optical storage, magnetic cassettes, magnetic tape, magnetic disk storage or other magnetic storage devices, or any other medium which can be used to store or communicate the desired information and which can be accessed by the computer 120.

The communication media typically embodies computer-readable instructions, data structures, program modules, or other data in a modulated data signal, such as a carrier wave or other typical transport mechanism, and includes any information delivery media. The term "modulated data signal" means a signal that has one or more of its characteristics set or changed in such a manner to encode information in the signal. By way of example, and not limitation, communication media includes wired media, such as a wired network or direct wired connection, and wireless media, such as acoustic, radio frequency, infrared, and other wireless media. Combinations of any of the above should also be included within the scope of computer-readable media.

The system memory 124 includes computer storage media in the form of volatile and non-volatile memory, such as read only memory ("ROM") 128 and random access memory ("RAM") 130. A basic input/output system 132 ("BIOS") containing basic routines that help to transfer information between elements within the computer 120, such as during startup, is typically stored in ROM 128. RAM 130 typically contains data and/or program modules that are immediately accessible to, and/or presently being operated on, by the processing unit 122. By way of example, and not limitation, FIG. 1 illustrates an operating system 146, application programs 148, other program modules 150, and program data 152. Also shown as residing in system memory 124 are a program list 180, a usage list 182, and a most used list 184. As will be better understood from the following description, the program list 180 is a list of execution points (including the actual program other execution points link to) with programs associated with each execution point. The program list is used by the present invention to determine eligible execution points to track when determining which are the most used programs of the computer 120. The usage list 182 is updated an intermediate list in which the usage values of the various execution points are updated in real-time to assist in determining the most frequently used programs. The most used list 184 is a list of the most used programs, usually in the order of the most used program first. In one embodiment of the present invention, a program list 180, a usage list 182, and a most used list 184 are associated with each user of a computer. In another embodiment, a single program list 180, usage list 182, and most used list 184 is associated with a computer.

While the term "most used" is used in the present program, it will be apparent that the term may refer to the "most recently used," "most frequently used," or a combination thereof. While any of these will work with the present invention, in the exemplary embodiment shown and described, a combination of most frequently used and most recently used is used to calculate a most used list 184. As the term since the last usage of a program increases, its usage value decreases; however, as a program is executed more often, its usage value increases. Accordingly, in one embodiment of the present invention, frequency may increase usage, while lack of "recency" will decrease usage.

The computer 120 may also include removable/non-removable, volatile/non-volatile computer storage media. By way of example only, FIG. 1 illustrates a hard disk drive 134 that reads from or writes to non-removable, non-volatile magnetic media 136, a magnetic drive 138 that reads from or writes to a removable, non-volatile magnetic disk 140, an optical drive 142 that reads from or writes to a removable, non-volatile optical disc 144, such as a CD-ROM or other optical media. Other removable/non-removable, volatile/non-volatile computer storage media that can be used in the exemplary operating environment include, but are not limited to, magnetic tape cassettes, flash memory cards, DVD's, digital video tapes, Bernoulli cap cartridges, solid state RAM, solid state ROM, and the like. The hard disk drive 134, magnetic disk drive 138, and optical disc drive 142 may be connected to the system bus 126 by a hard disk drive interface 154, a magnetic disk drive interface 156, and an optical drive interface 158, respectively. Alternatively, hard disk drive 134, magnetic disk drive 138, and optical disc drive 142 may be connected to the system bus 126 by a small computer system interface ("SCSI").

The drives and their associated computer storage media discussed above and illustrated in FIG. 1, provide storage of computer-readable instructions, data structures, program modules, and other data from the computer 120. In FIG. 1, for example, the hard disk drive 134 may also store the operating system 146, application programs 148, other programs 150, program data 152, a program list 180, a usage list 182, and a most used list 184. Note that these components can either be the same as or different from the operating system 146, the other program modules 150, and the program data 152. A user may enter commands and information into the computer 120 through an input device, such as keyboard 160 and/or a pointing device 162, commonly referred to as a mouse, trackball, or touch pad. Other input devices (not shown) may include a microphone, a joystick, a game pad, a satellite dish, a scanner, or the like. These and other input devices are often connected to the system bus 126 through user input interface 164 and may be connected by other interface and bus structures, such as a parallel port, serial port, game port, universal serial bus ("USB"), or other interface.

The computer 120 may operate in a network environment using logical connections to one or more remote computers 165. The remote computer 165 may be a personal computer, a server, a router, a network PC, a peer device, or other common network node and typically includes many or all the elements described above relative to the computer 120. The logical connections depicted in FIG. 1 include a local area network ("LAN") 166 and a wide area network ("WAN") 167, but may also include other networks. Such network environments are commonplace in offices, enterprise-wide computer networks, intranets, and the Internet.

When used in a LAN network environment, the computer 120 is connected to the LAN 166 through a network interface 168. When using a WAN network environment, the computer typically includes a modem or other means for establishing communication over the WAN, including a network interface 168, over the WAN 167, such as the Internet. The modem 169, which may be internal or external, may be connected to the system bus 126 via the user input interface 164 or other appropriate mechanism. It will be appreciated that the network connections shown are exemplary and that other means of establishing communications between computers may be used. Although many other internal components of the computer 120 are not shown, those of ordinary skill in the art will appreciate that such components and their interconnections are well known. Accordingly, additional details concerning the internal construction of the computer 120 need not be disclosed in connection with the present invention.

Those skilled in the art will understand that program modules, such as the operating system 146, the application programs 148, and the data 152 are provided to the computer 120 via one of its memory storage devices, which may include ROM 128, RAM 130, hard disk 134, magnetic disk drive 138, or optical disc drive 142. The hard disk drive 134 is used to store data 152 and programs, including the operating system 146 and application programs 148.

When the computer 120 is turned on or reset, the BIOS 132, which is stored in ROM, instructs the processing unit 122 to load the operating system 146 from the hard disk drive 134 into the RAM 130. Once the operating system 146 is loaded into RAM 130, the processing unit 122 executes the operating system code and causes the visual elements associated with the user interface of the operating system to be displayed on a monitor. When a program 148 is opened by a user, the program code and relevant data are read from the hard disk drive 134 and stored in RAM 130.

FIGS. 2-8 are flow diagrams that illustrate routines and subroutines of a first embodiment of the present invention. In this embodiment of the invention, the most used programs list 184 is dynamically populated in real time when a user requests a menu of program execution points. While the requested menu may be displayed as the result of the actuation of a start button, and thus, be displayed as part of a start menu, those of ordinary skill in the art will appreciate that the most used list 184 may be presented in other forms.

Figure 2:
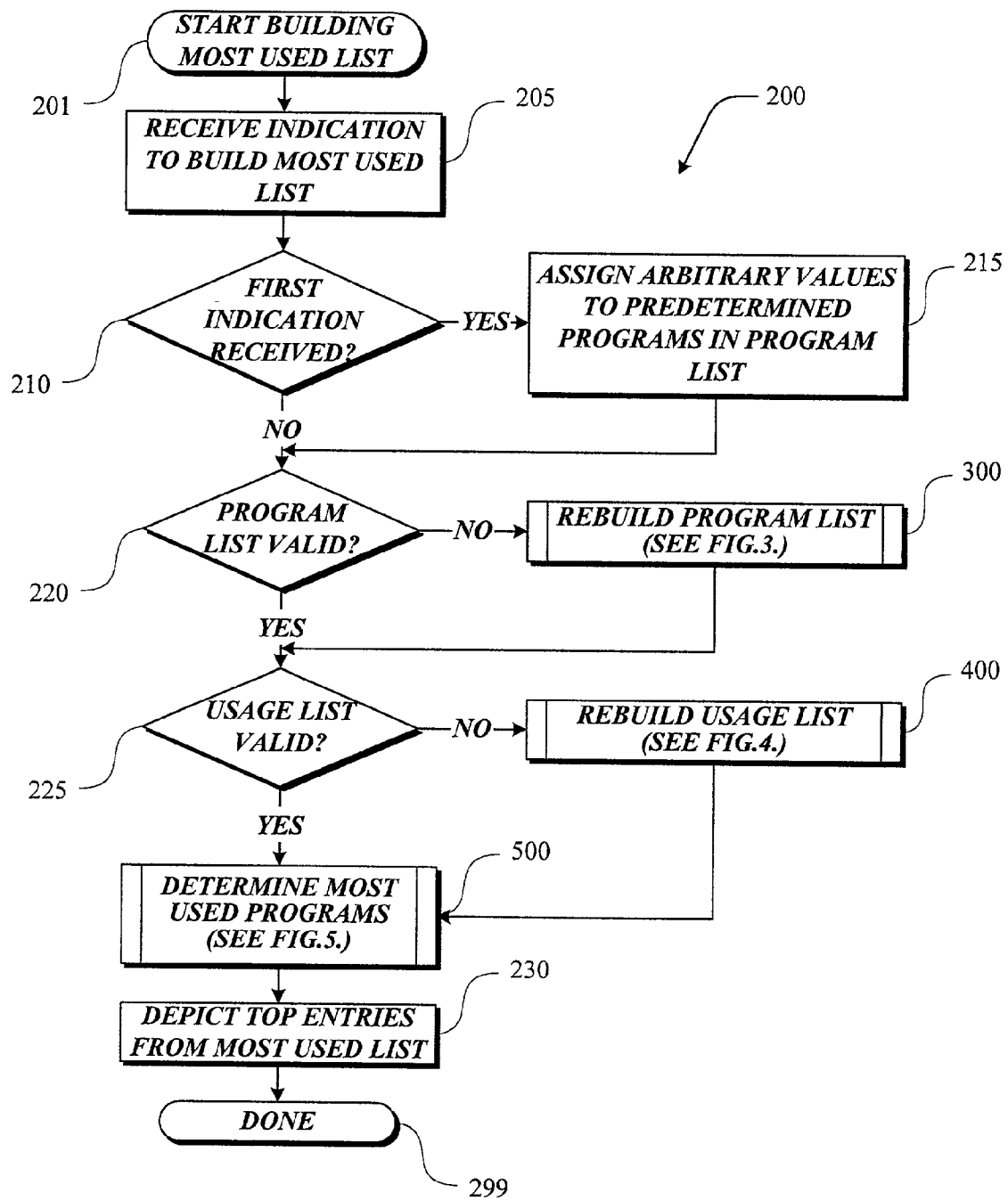
FIG. 2 is a flow diagram illustrating a routine for building a most used list formed in accordance with the present invention.

FIG. 2 illustrates a routine 200 for building a most used list 184 in accordance with the present invention. Routine 200 begins in block 201 and proceeds to block 205 where an indication to build the most used list 184 is received (e.g., a user clicks on an object to request the most used programs or otherwise request such a list). Next, in determination block 210, a test is made to determine if this is the first time that an indication has been received to build a most used programs list 184. If this is the first time that an indication has been received to build a most used programs list, then in block 215 arbitrary values are assigned to a selection of predetermined program execution points in a program list 180 of programs available for execution, e.g., installed on the computer and not excluded from the list as described below, in the case of a stand alone personal computer, or available for downloading, in the case of a networked computer. In the case of a stand alone personal computer, the predetermined programs may be selected by the developers of the operating system 146, the manufacturer of the computer 120, or a combination thereof. In one exemplary embodiment, half of the predetermined programs are assigned by the operating system developer, and half are assigned by the computer manufacturer.

After arbitrary values have been assigned (block 215), or if decision block 210 generates a negative result, processing cycles to decision block 220 where a test is made to determine if the program list 180 is valid. This validity check may be accomplished by a number of different possible mechanisms. For example, a "flag" may be raised when the program list 180 has changed and has not yet been rebuilt, which would render it invalid. Alternatively, the validity of the program list 180 may expire at periodic intervals and require that the program list be rebuilt. Of course, those of ordinary skill in the art will appreciate that many other factors may be used to determine the validity of a program list 180.

If, in determination block 220, the program list 180 is determined to be invalid, then routine 200 proceeds to subroutine block 300 where the program list 180 is rebuilt. Rebuilding the program list 180 is discussed in greater detail below with regard to FIG. 3.

After the program list is rebuilt (block 300), or if the program list is determined to be valid (block 220), routine 200 proceeds to decision block 225 where a test is made to determine if the usage list 182 is valid. Similar to the program list 180, there are a number of different indicators that may be used to determine if the usage list 182 is valid. The most common factor for determining if the usage list 182 is valid is whether there has been a change in the usage values or the contents of the program list 180. For example, if an execution point has been removed from the program list 180, the removal would render the usage list 182 invalid if the usage list included usage values for the removed execution point. Time is another factor. A flag may be set at periodic intervals that causes the usage list to be determined to be invalid.

If, in decision block 225, the usage list 182 is determined to be invalid, the logic flow proceeds to subroutine block 400 where the usage list 182 is rebuilt. Subroutine 400 is discussed in greater detail below with regard to FIG. 4.

After the usage list 182 is rebuilt (block 400), or if the usage list 182 is determined to be valid (block 225), routine 200 proceeds to subroutine block 500 where the most used programs are determined. Subroutine 500 returns a most used list 184, the calculation of which is discussed in greater detail below with regard to FIG. 5. Next, in block 230, a predetermined number of execution points for the top most used programs are depicted (displayed, broadcast, or otherwise communicated) from the most used list 184. In one exemplary embodiment of the invention, the predetermined number includes between five and eight execution points. Those of ordinary skill in the art will appreciate that other predetermined numbers of execution points may be used when depicting the most used list 184. In one embodiment of the invention, the size of the depicted most used list 184 is only limited by the number of execution points that can be displayed by the computer 120 on display 190. Once the predetermined number of execution points have depicted, as shown by block 235, routine 200 then ends at block 299.

Figure 3:
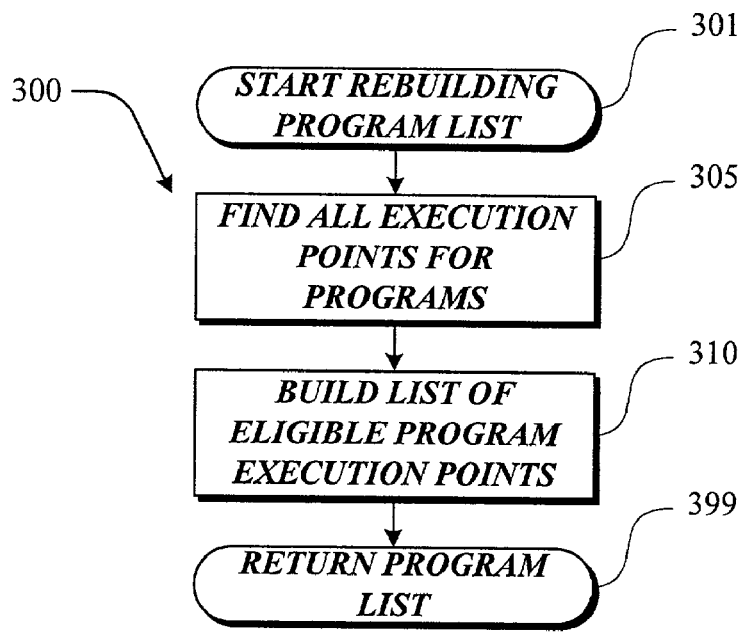
FIG. 3 is a flow diagram illustrating a rebuild program list subroutine suitable for use in the routine illustrated in FIG. 2.
Figure 4:
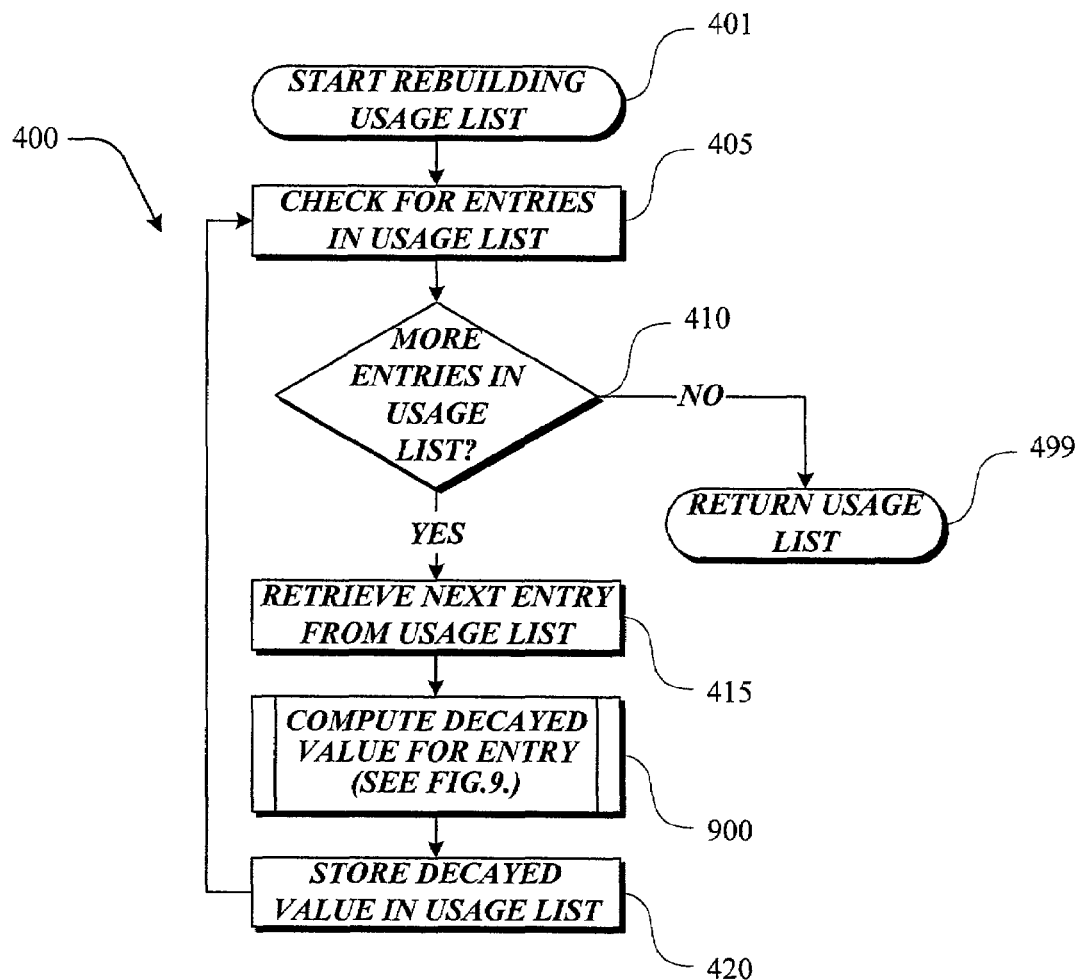
FIG. 4 is a flow diagram illustrating a rebuild usage list subroutine suitable for use in the routine illustrated in FIG. 2.
Figure 5:
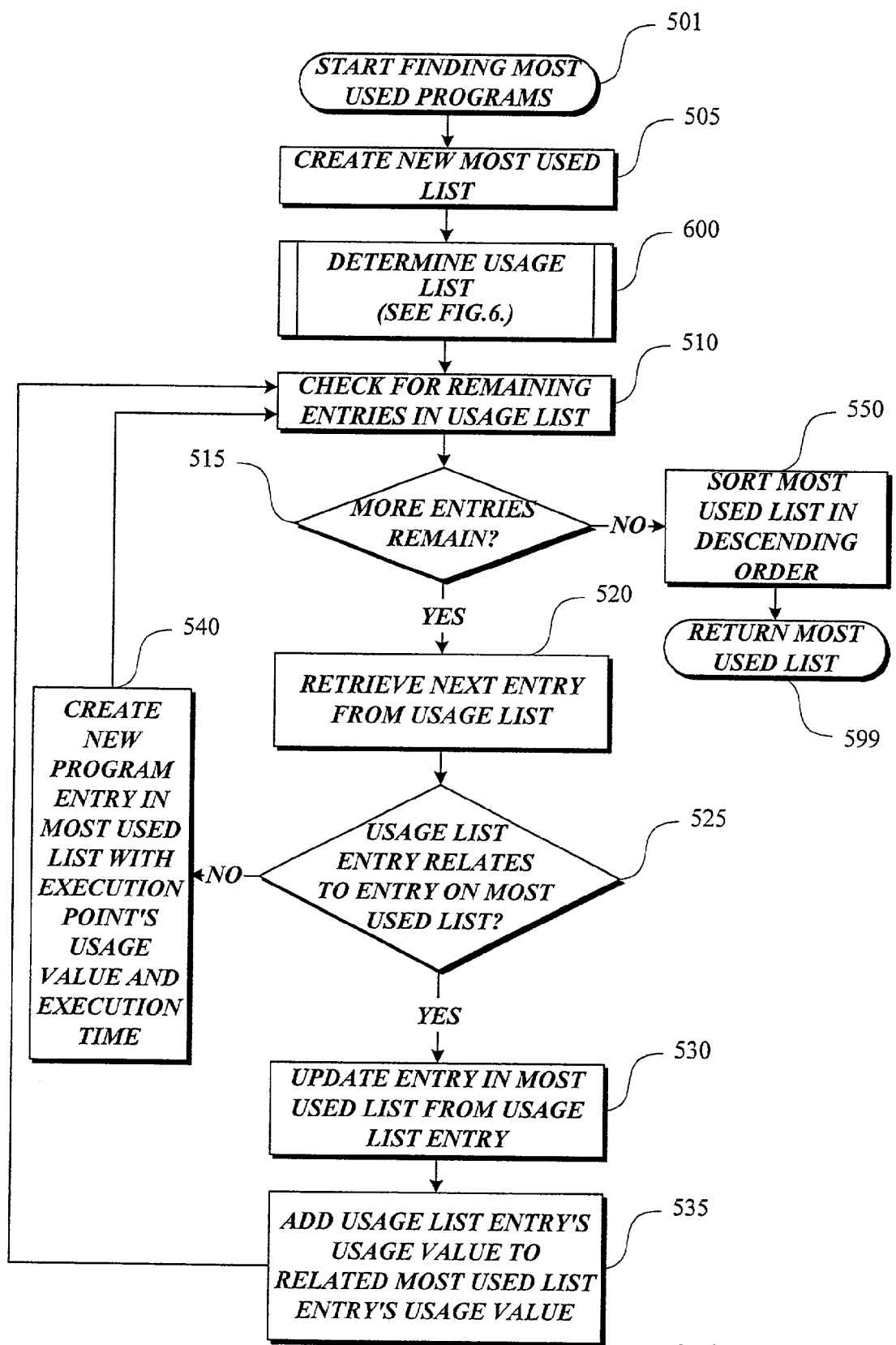
FIG. 5 is a flow diagram illustrating a determining the most used programs subroutine suitable for use in the routine illustrated in FIG. 2.

As noted above, subroutines 300-500 shown in FIG. 2 are illustrated in detail in FIGS. 3-5. These figures are next described in detail.

Starting with FIG. 3, subroutine 300 begins at block 301 and proceeds to block 305 where all the eligible execution points for executable programs are located. Finding all eligible points for executable programs in one embodiment of the invention involves searching for execution points under the start menu, program files menu, and desktop portions of a graphical user interface in a computer operating system, such as computer operating system 146 shown in FIG. 1 and described above. It will also be apparent to one of ordinary skill in the art that occasionally execution points within a graphical user interface or menus within such a graphical user interface will not be of interest for determining the most used programs. For example, in one embodiment the execution points listed under a "startup" folder are not included when determining most used programs. In another embodiment the graphical user interface of the operating system 146 includes a "pinned" listing of execution points. The pinned execution points (such as the pinned execution points 1540 illustrated in FIG. 15 and described below) are execution points that have been specifically placed into a static listing of execution points by the user and/or operating system 146. Accordingly, the user or developer of the operating system 146 has already determined that these programs are of a high enough interest that they will always be visible when requesting a listing of programs, and therefore, it would be duplicative to list these same programs in the most used list 184. Thus, when searching for most used programs, entries in the pinned list 1540 are not considered as eligible. In subroutine 300, once all the eligible execution points have been found, a list of eligible program execution points 180 is built as shown by block 310. The program list 180 is then returned to the calling routine as shown by block 399 and subroutine 300 ends.

Turning now to FIG. 4, subroutine 400 rebuilds a usage list. The usage list 182 contains usage values for all execution points contained in the program list 180. As will be better understood from the following discussion of subroutine 500 (FIG. 5), an initial usage list 182 is built during the first pass through the start building most used list routine 200 (FIG. 2), at which time the usage list 182 is flagged as valid.

Subroutine 400 begins at block 401 and proceeds to block 405 where a check is made to determine if there are any entries in the usage list 182. Next, in decision block 410 if it is determined that there are entries in the usage list 182, the next entry is retrieved (block 415). Otherwise, if there are no more entries to be retrieved, the rebuilding of the usage list is complete, and the current usage list 182 is returned to the calling routine (block 499).

Figure 9:
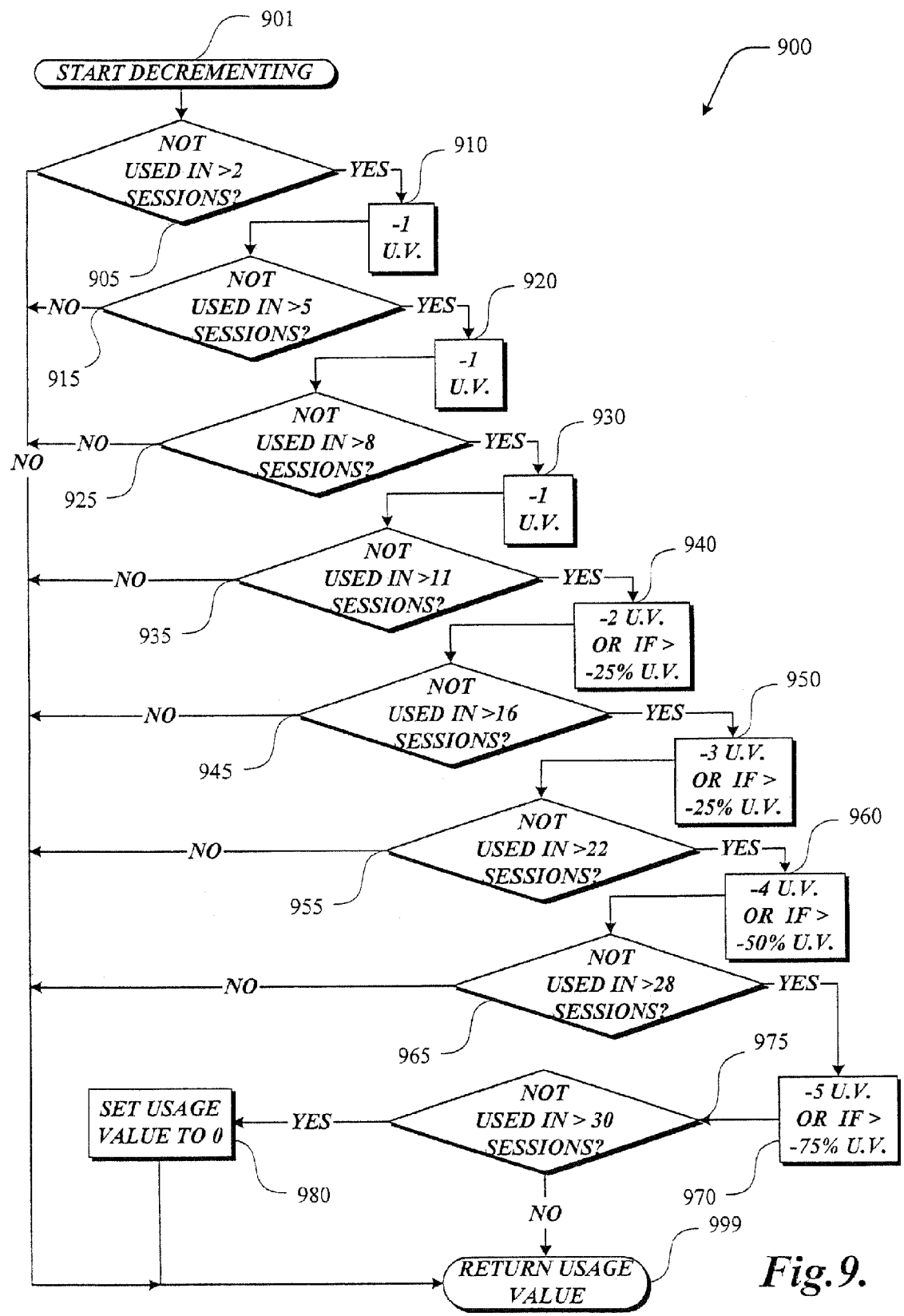
FIG. 9 is a flow diagram illustrating a compute decayed value for entry subroutine suitable for use in the routine illustrated in FIGS. 4 and 7.

In addition to retrieving the next entry from the usage list (block 415), the retrieved entry is flagged as retrieved, which effectively removes the entry from the usage list being checked in block 405. After the next entry is retrieved from the usage list, the decayed value for the retrieved entry is determined in a subroutine represented by block 900. The decayed value is a determination of the current usage value of the execution point corresponding to the entry as adjusted for lack of usage over time. Subroutine 900 is illustrated in FIG. 9 and discussed in greater detail. Once the decayed value for the entry has been determined, subroutine 400 continues to block 420 where the decayed value is stored in the usage list 182. Subroutine 400 then loops back to block 405 and checks to see if any more entries remain in the usage list 182. As noted above, subroutine 400 ends when all of the entries in the usage list 182 have been checked, resulting in a rebuilt usage list.

FIG. 5 illustrates a subroutine 500 for finding the most used programs. Subroutine 500 starts at block 501 and proceeds to block 505, where a new empty most used list 184 is created (or an old list may be reused). Subroutine 500 then proceeds to subroutine block 600, where usage list is determined. Subroutine 600 is discussed in greater detail below with regard to FIG. 6. After executing subroutine 600, a current usage list 182 is returned. Next, in block 510, a check is made to determine if there are any entries remaining for review in the usage list 182. If, in decision block 515, it is determined that more entries remain for examination, then processing proceeds to block 520 where the next entry is retrieved from the usage list 182. If, however, it was determined in decision block 515 that there were no more entries in the usage list 182, processing proceeds to block 550, where the most used list is sorted in descending order, after which subroutine 500 returns the sorted most used list 184 with total usage values for eligible programs and ends, as shown in block 599.

Returning to block 515, once an execution point entry is retrieved from the usage list 182, the entry is flagged as retrieved or in some other way "removed" from consideration from the usage list checked in block 510. In decision block 525, a test is made of the retrieved entry to determine if the entry relates to a program already on the most used list 184. If so, processing continues to block 530; otherwise, in block 540, new program entry is created in the most used list 184. The new program entry includes the execution point's usage value and execution time, which are retrieved from the usage list 182. If in decision block 525, it was determined that the usage list entry does correspond or relate to a program on the most used list 184, then, in block 530, the entry in the most used list 184 is updated with information from the entry of the usage list 182. The information may include a time stamp, execution parameter or any other details from the usage list entry. In one embodiment, the details from the execution point with the most usage are used to update the most used list 184, with ties being broken by the more recent timestamp. Next, in block 535, the usage value from the retrieved entry from the usage list 182 is added to the usage value of the entry for the program entry in the most used list 184. This allows the most used list 184 to aggregate the usage values of all the execution points for a particular program. Additionally, by using only the most recent execution time from block 530, the execution time on the most used list will be the execution time for the most recent execution of the program.

Figure 6:
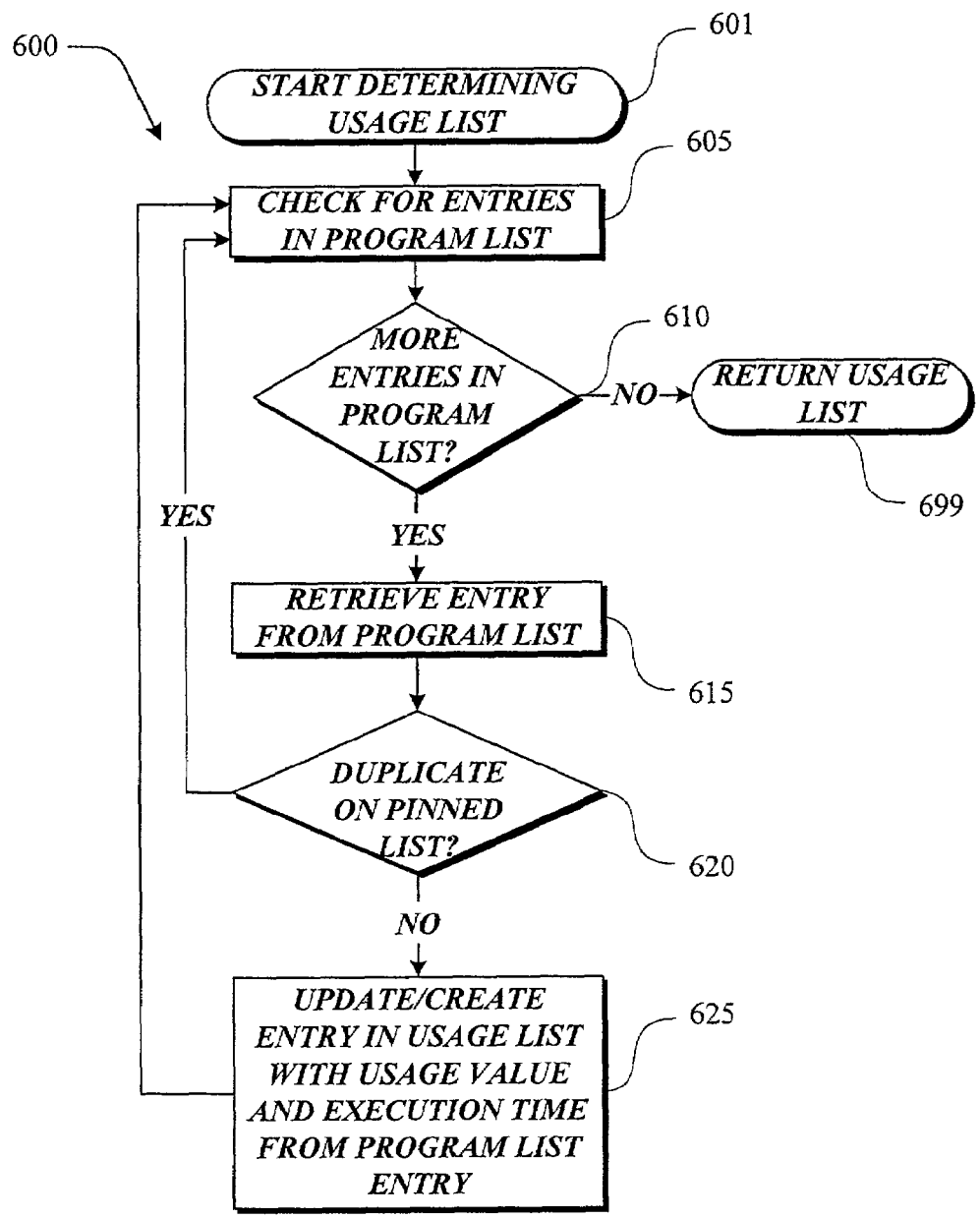
FIG. 6 is a flow diagram illustrating a determining the most used execution points subroutine suitable for use in the subroutine illustrated in FIG. 5.

FIG. 6 illustrates a subroutine 600 for determining a usage list 182. Subroutine 600 starts at block 601 and proceeds to block 605 where a check is made to determine if there are any remaining entries in the program list 180. Next, in decision block 610, if it is determined that there are entries in the program list 180, processing proceeds to block 615 where the next entry is retrieved from the program list 180. If, however, it was determined in decision block 610 that there were no more entries in the program list 180, subroutine 600 returns the usage list 182 and ends, as shown in block 699.

Figure 16:
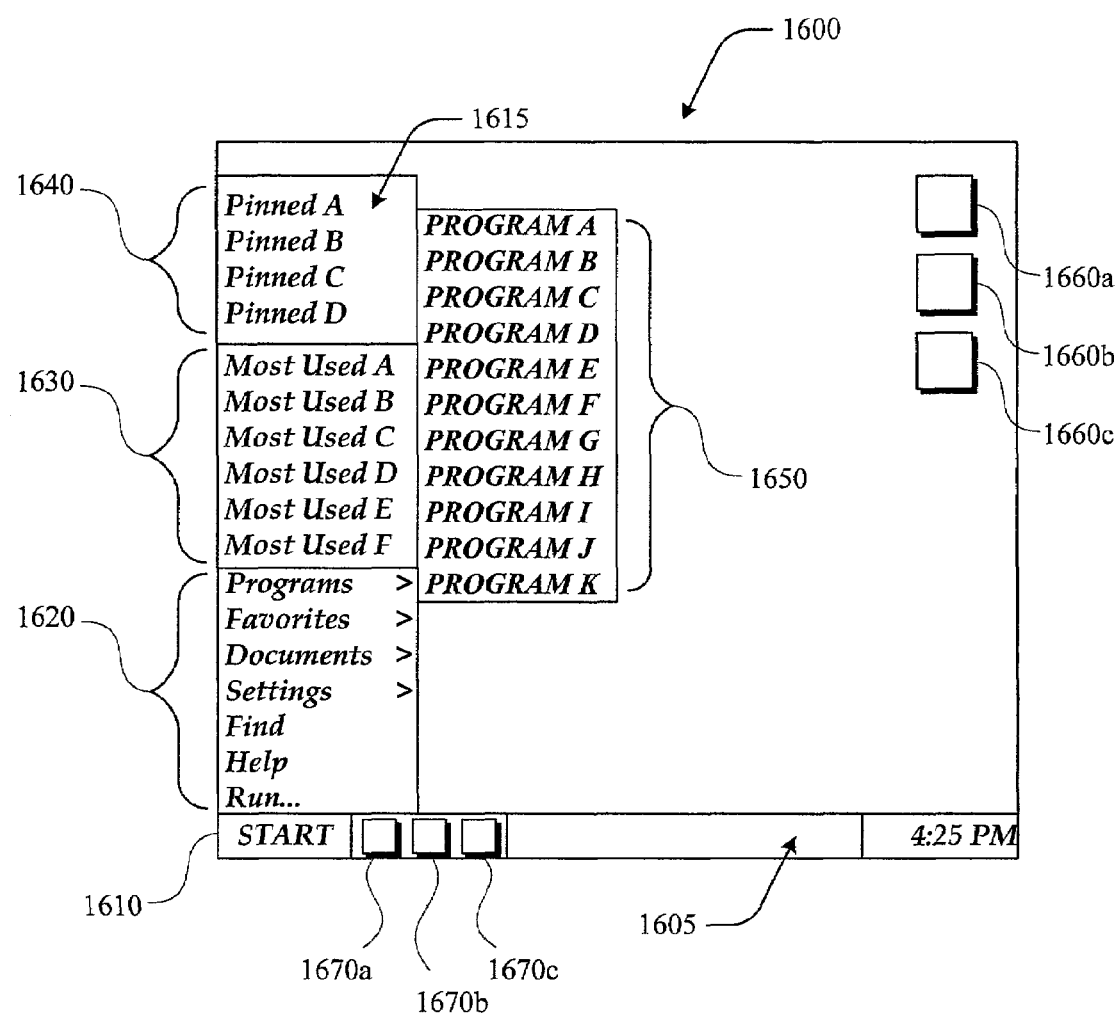
FIG. 16 is an exemplary screen shot of an operating system user interface formed in accordance with the present invention.

Returning to block 615, once an entry is retrieved from the program list, the entry is flagged as retrieved or in some other way "removed" from consideration from the program list checked in block 605. In decision block 620, a test is made of the retrieved entry to determine if the program related to the retrieved entry is a duplicate of a program included in the pinned list 1640 (FIG. 16, described below). If it is determined in decision block 620 that the program related to the retrieved entry duplicates a program included in the pinned list 1640, processing loops back to block 605, where the program list is checked for additional entries. If, however, in decision block 620, it was determined that the program related to the retrieved entry is not a duplicate of any program on the pinned list 1640, processing proceeds to block 625. In block 625, a usage list entry associated with the retrieved program list entry is updated. Or, if no usage list exists, a usage list entry is created. The usage list entry updating or creation includes the usage value and the execution time associated with the program list entry relating to the execution point. In this regard, the program list includes an entry for each execution point associated with a program. Subroutine 600 then loops back to block 605 to check for additional entries in the program list 180.

Figure 7:
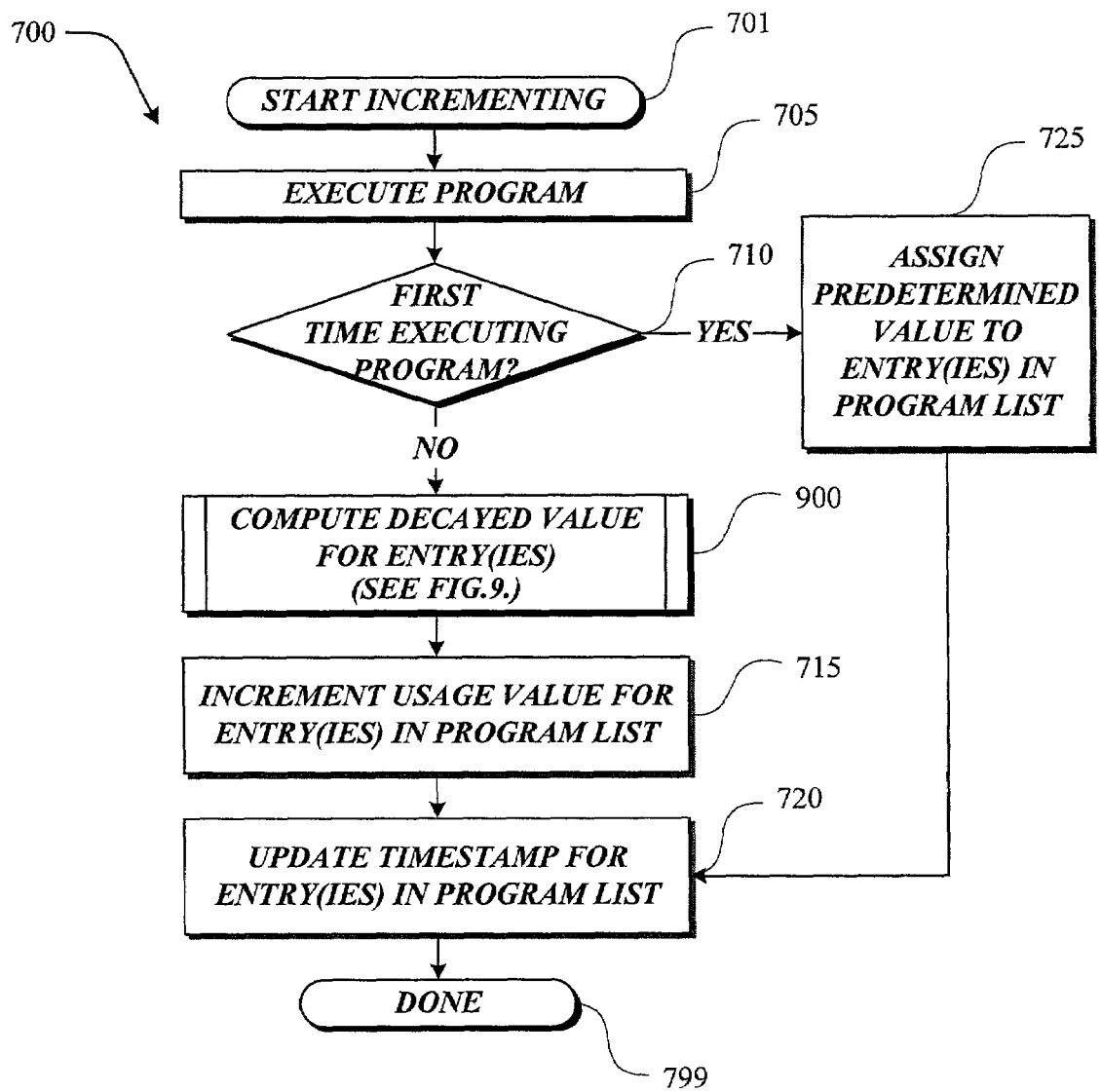
FIG. 7 is a flow diagram illustrating a routine for incrementing a usage value for executed programs formed in accordance with the present invention.

FIG. 7 illustrates a routine for incrementing usage values when a program is executed. This routine runs each time a program is executed and maintains usage values current. Routine 700 begins in block 701 and proceeds to block 705 when a program is started (executed) by conventional user interaction with an execution point. Next, in decision block 710, a test is made to determine if this is the first time the execution point is used. If, in decision block 710, it is determined that the execution point is being used for the first time, then, in block 725, a predetermined value is assigned to the execution point for the program and if the execution point is not the original program (e.g., it is a link or a shortcut) then the program also gets an initial value in its program list entry. Processing then proceeds to block 720, which is described below. If in decision block 710 it is determined that the execution point is not being used for the first time, processing continues to subroutine block 900 where a decayed usage value is calculated for the execution point. Next, in block 715, the usage value is incremented for the execution point that started the program (and for the program any execution point links to). Then, in block 720, the time stamp and the usage value of the execution point entry(ies) are updated in the program list 180. The time stamp enables other routines of the present invention to determine whether a program has been more recently executed in the event that the execution point usage values of two programs are identical. Accordingly, in one embodiment of the present invention, if two execution point usage values of a particular program are identical, the program with the most recent time stamp will be listed as being more "used" than a program with a more remote time stamp. Routine 700 then ends in block 799.

Figure 8:
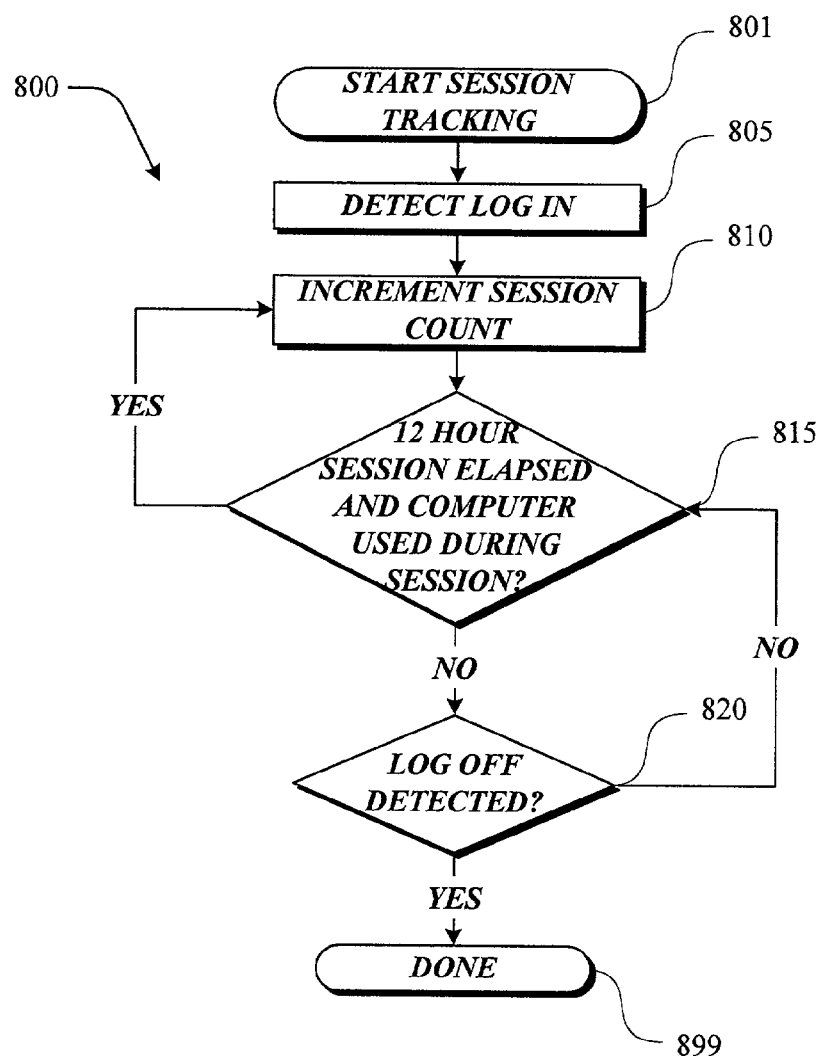
FIG. 8 is a flow diagram illustrating a routine for tracking session usage formed in accordance with the present invention.

In addition to time stamping execution points for "tie breaking" purposes, the present invention tracks the general usage of a computer 120 when determining which programs are most used. In this regard, FIG. 8 illustrates a routine 800 for tracking "sessions" of usage of a computer system 120. Routine 800 starts in block 801 and proceeds to block 805 which detects a boot up or log in sequence. After the log in, a session count is incremented as noted in block 810. Then, in decision block 815, a test is made to determine whether a twelve-hour period of time has elapsed and whether the computer 120 has been used, e.g., there has been some user interaction, during the twelve-hour period. If this twelve-hour period has elapsed and there was some usage during the twelve-hour period, then another session is counted and processing loops back to block 810 where the session count is incremented. If, however, no usage occurred during the twelve-hour period, processing proceeds to decision block 820 where a test is made to determine whether a log off or shut down sequence has occurred. If a log off or shut down sequence has occurred, routine 800 ends at block 899. Otherwise, processing cycles back to decision block 815 and waits for another period of time to elapse before determining if any computer usage occurred during the twelve-hour period.

As mentioned above, FIG. 9 illustrates subroutine 900 for decrementing a usage value for an execution point that has not been used for a period of time to execute (call) a related program. In particular, the periods of time are measured in sessions as described above with regard to FIG. 8. Subroutine 900 begins at block 901 and proceeds to decision block 905 where a test is made to determine if the execution point has not been used in greater than two sessions. If, in decision block 905, it is determined that the execution point in question has not been used in greater than two sessions, the execution point's usage value is reduced by one (block 910) and processing continues to decision block 915. Otherwise, if the execution point has been used in the last two sessions, the execution point's usage value is not adjusted and processing proceeds to block 899 where the usage value is returned intact.

At decision block 915, a test is made to determine if the execution point has not been used in greater than five sessions. If the execution point has not been used in greater than five sessions, in block 920, another point is removed from the usage value. Then, processing continues to block 925. Otherwise, the current usage value is returned in block 999.

At decision block 925 a list is made to determine if the execution point has not been used in greater than eight sessions. If the execution point has not been used in greater than eight sessions, in block 930, another point is removed from its usage value and processing continues to decision block 935. Otherwise, the current usage value is returned in block 999.

At decision block 935, a test is made to determine if the execution point has not been used in greater than eleven sessions. If the execution point has not been used in greater than eleven sessions, in block 940, the greater of two points or 25% of the usage value is subtracted from the current usage value of the execution point and processing continues to decision block 945. Otherwise, if the execution point has been executed in the past eleven sessions, processing continues to block 999, where the current usage value is returned.

At decision block 945, a test is made to determine if the execution point has not been used in greater than sixteen sessions. If the execution point has not been used in greater than sixteen sessions, in block 950, the greater of three points or 25% of the usage value is removed from the execution point's current usage value and processing continues to decision block 955. Otherwise, if it is found that the execution point has been executed within the past sixteen sessions, processing continues to block 999, where the current usage value is retrieved.

At decision block 955, a test is made to determine if the execution point has not been used in greater than twenty-two sessions. If the execution point has not been used in greater than twenty-two sessions, in block 960, the greater of four points or 50% of the current usage value is removed from the current usage value and processing continues to decision block 965. Otherwise, if in decision block 955 it is determined that the execution point has been executed in the past twenty-two sessions, processing proceeds to block 999 and the current usage value is returned.

At decision block 965, a test is made to determine if the execution point has not been used in greater than twenty-eight sessions. If the execution point has not been used in greater than twenty-eight sessions, in block 970, the greater of five points or 75% of the current usage value is removed from the current usage value and processing continues to decision block 975. Otherwise, if in decision block 965 it was determined that the execution point has been used in the last twenty-eight sessions, processing proceeds to block 999 where the current usage value is returned.

At decision block 975, a test is made to determine if the execution point has not been used in greater than thirty sessions. If the usage value has not been used in greater than thirty sessions, in block 980, the usage value is set to zero. (In one embodiment of the present invention, a usage value of zero indicates that an execution point should not be displayed on the most used list even if a predetermined number of programs has not been found to fill the most used list 184.) Next, in block 999, the current usage value of zero is returned. Otherwise, if in decision block 975, it was determined that the execution point had been executed in the past thirty sessions, processing continues to block 999 where the current usage value is returned. Those of ordinary skill in the art will of course appreciate that values other than those shown in FIG. 9 and described above may be used when determining what session will trigger a particular decay in the usage value. Both sessions trigger values and amounts of decay can be changed without departing from the spirit and scope of this invention.

As will be readily appreciated from the foregoing description, FIGS. 2-9 illustrate an embodiment of the present program that provides real time calculations of usage values for programs executed on a computer 120. It will be apparent to one of ordinary skill in the art that a number of changes may be made to the calculations and order of processing without departing from the spirit and scope of the present invention. For example, the program list may comprise, as described above, multiple execution points all referring to the same program that can be further consolidated in subsequent routines according to one embodiment of the present invention. However, it will also be apparent to one of ordinary skill in the art that the consolidation in the program list may happen as the program list is created, thereby obviating the need to track individual execution points as values for each execution point would map to the entry referring to the program to which they point. Such a consolidated program list may thereby obviate the need for a separate usage list and most used list if the most used list was simply a usage value sorted program list as the program list would have already been consolidated. It will be appreciated that various other changes can be made to this embodiment without departing from the spirit and scope of the present invention.

Figure 10:
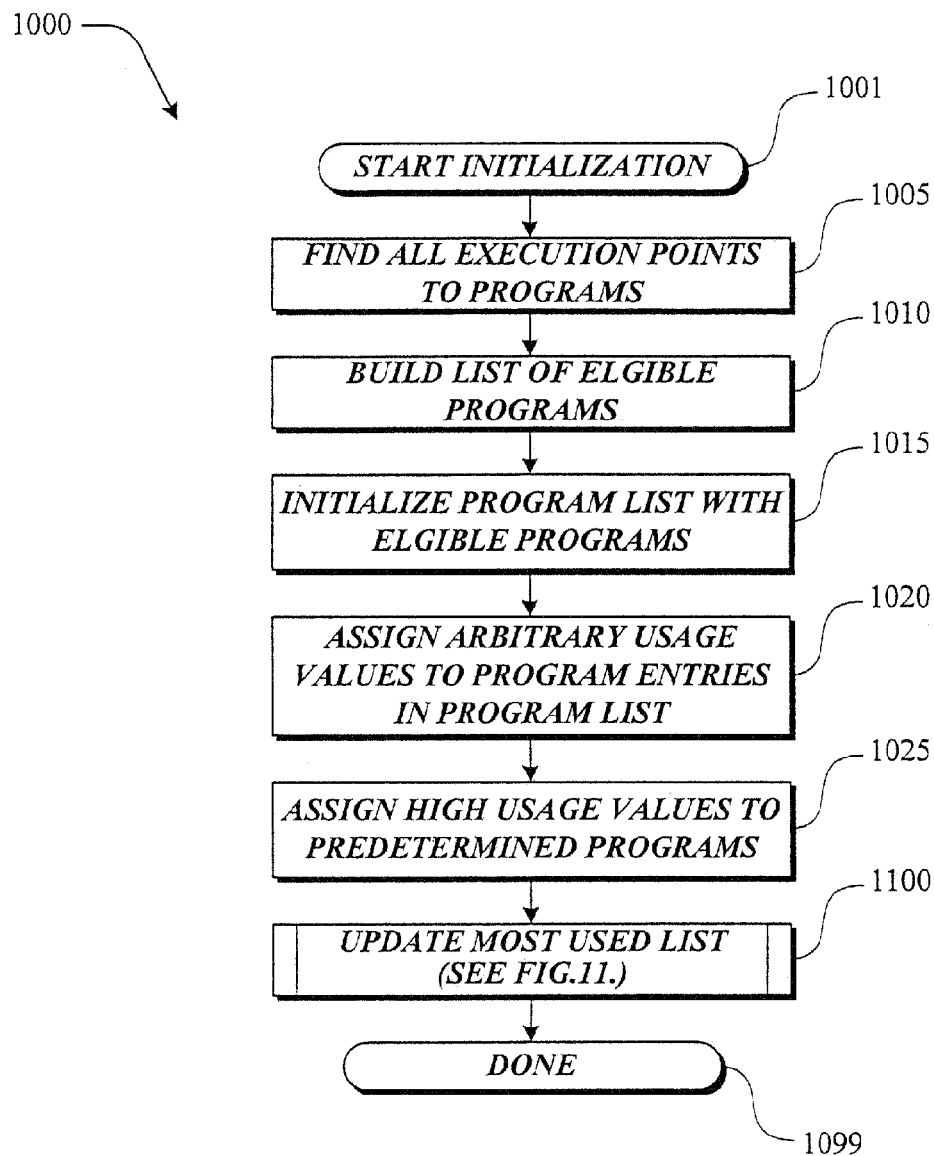
FIG. 10 is a flow diagram illustrating initialization routine of an alternative embodiment of the present invention.
Figure 11:
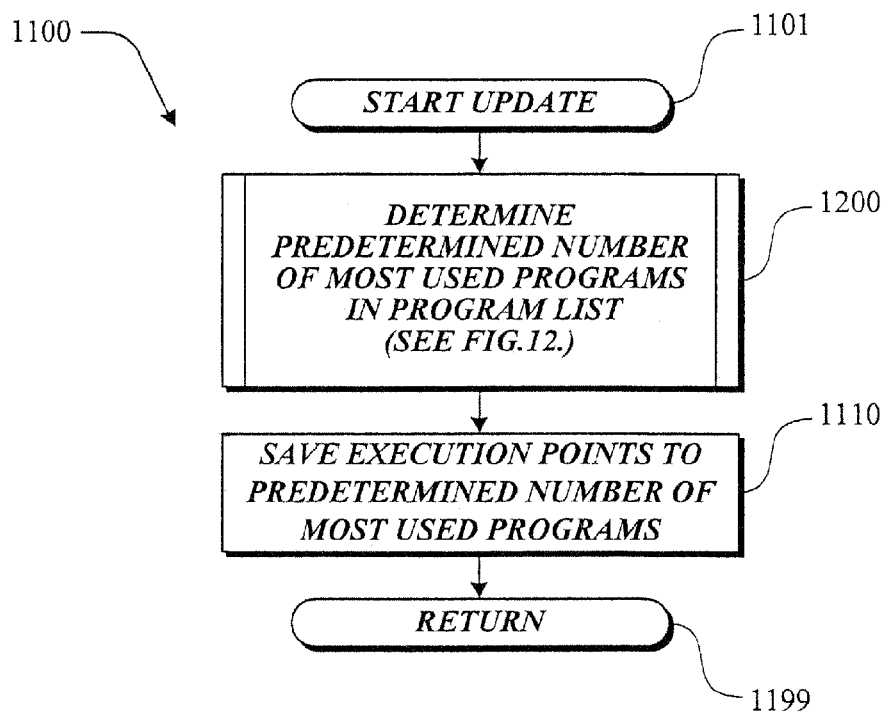
FIG. 11 is a flow diagram illustrating an update most used list subroutine suitable for use in the routine illustrated in FIG. 10.

FIGS. 10-14 illustrate an alternate embodiment of the present invention. In this embodiment of the invention, a most used list is periodically updated and the result used to create a limited length most used list that is displayed to aid a user in finding and executing the most used programs on their computer 120. FIG. 10 illustrates an exemplary initialization routine that initializes and creates the information necessary to begin populating a most used list 184. Routine 1000 begins at block 1001 and proceeds to block 1005 where all the execution points to programs stored on a computer are located. In one embodiment of the present invention, the execution points under a start menu 1615, a program files menu 1650, and desktop 1600 portions of a graphical user interface in a computer operating system (all shown in FIG. 16 and described below) are located. Next, in block 1010, a list of eligible programs 180 is built from the execution points information found in block 1005. Programs that are on a pinned list 1640 (FIG. 16) and on any "kill" lists of specifically excluded programs or program directories are not considered eligible programs and are not included in the valid program list. Next, in block 1015, the program list 180 is initialized as the list of located valid programs. In block 1020, arbitrary usage values are assigned to entries in the program list. As a result, arbitrarily, some entries have higher usage values that other entries. If desired, as shown in block 1025, an operating system developer or computer manufacturer can assign high usage values to predetermined programs on the program list. This assigning of high usage values to predetermined programs on the program list pre-populates the most used list 184 when the most used list is updated by subroutine 1100. Subroutine 1100 is illustrated in FIG. 11 and discussed in greater detail below. Finally, after a pass through subroutine 1100 is completed, routine 1000 ends at block 1099.

FIG. 11 illustrates subroutine 1100 for updating a most used list 184. Subroutine 1100 begins at block 1101 and proceeds to subroutine 1200. Subroutine 1200 determines a predetermined number of most used programs contained in the program list 180. Subroutine 1200 is described in greater detail below with regard to FIG. 12. Next, in block 1110, execution points to the predetermined number of most used programs are saved as the most used list 184. Subroutine 1100 then proceeds to block 1199 which returns to its calling routine. The most used list 184 is used whenever a request is received to display the most used programs, such as the most used list 1630 shown in FIG. 16 and described below.

Figure 12:
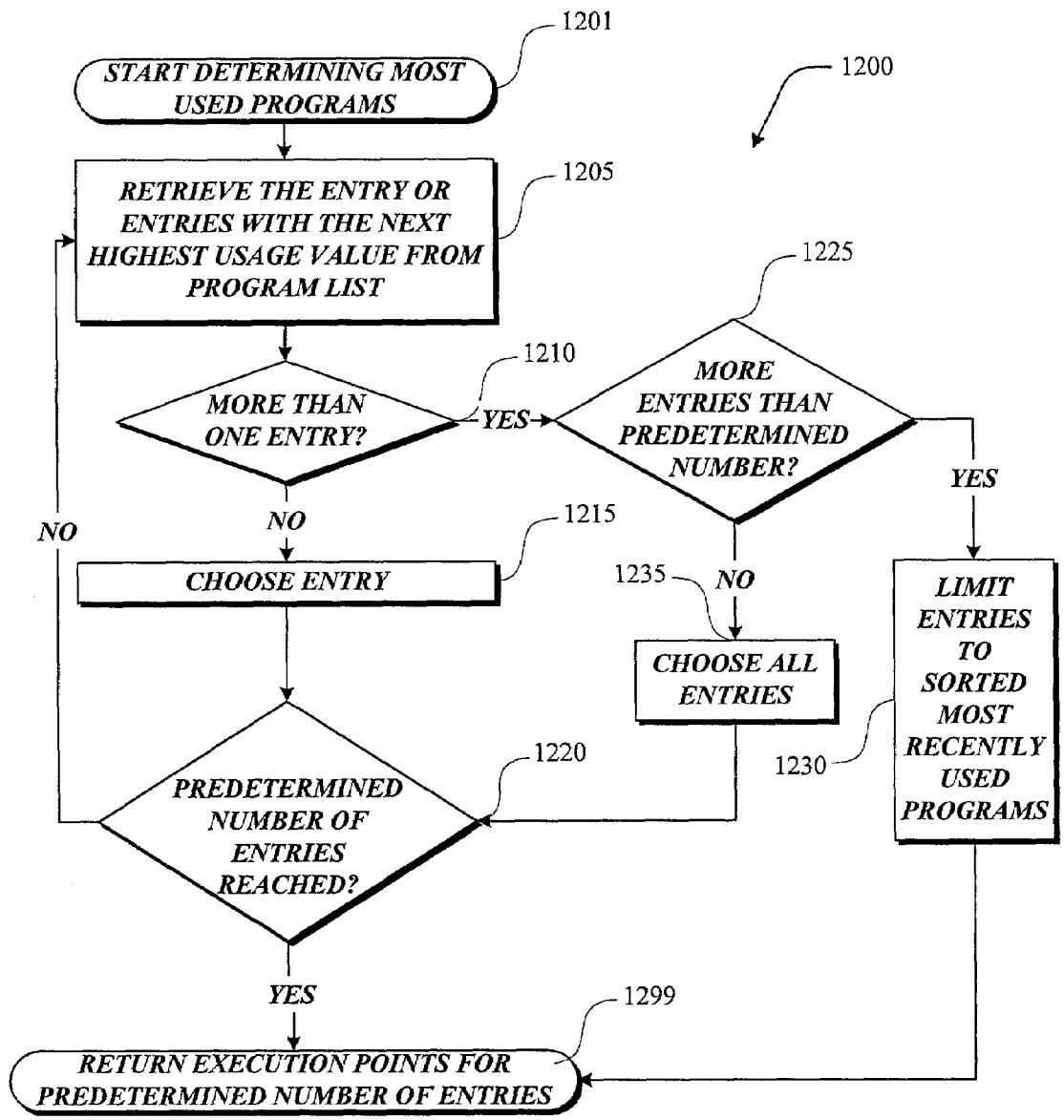
FIG. 12 is a flow diagram illustrating a predetermined number of most used programs in a program list subroutine suitable for use in the subroutine illustrated in FIG. 11.

FIG. 12 illustrates a subroutine 1200 for determining the most used programs to be included in the most used list 184. Routine 1200 beings at block 1201 and proceeds to 1205 where the program list 180 is searched and the entry or entries with the next highest usage value are retrieved. If the first pass, this is the entry or entries with the highest usage value. Then, in decision block 1210, a test is made to determine if more than one entry with the same usage value was retrieved. If, in decision block 1210, subroutine 1200 determines that more than one entry was retrieved, the subroutine cycles to decision block 1225 where a test is made to determine if more entries than a predetermined number of slots in the most used list 184 have been retrieved. If more entries than the predetermined number of slots have been retrieved, in block 1230, the entries are chronologically sorted to the number that equals the predetermined number of slots in the most used list 184. Next, processing proceeds to block 1299 where the execution points from this predetermined number of chronologically sorted entries are returned to the calling routine.

If, in decision block 1225, it was determined that there were not more entries than the number of slots in the most used list 184 in block 1235, all entries are chosen. Then processing continues to block 1220, where a test is made to determine if the predetermined number of entries has been reached. If the predetermined number of entries has been reached, subroutine 1200 proceeds to block 1299, where execution points for the predetermined number of entries are returned to the calling routine.

If, in decision block 1220, it is determined that the predetermined number of entries has not been reached, processing returns to block 1205 where the program list is searching for entry or entries with the next highest usage value and the process is repeated. If, in decision block 1210, it was determined that only a single entry was retrieved, that entry is chosen (block 1215) and processing continues to decision block 1220 as described above.

Figure 13:
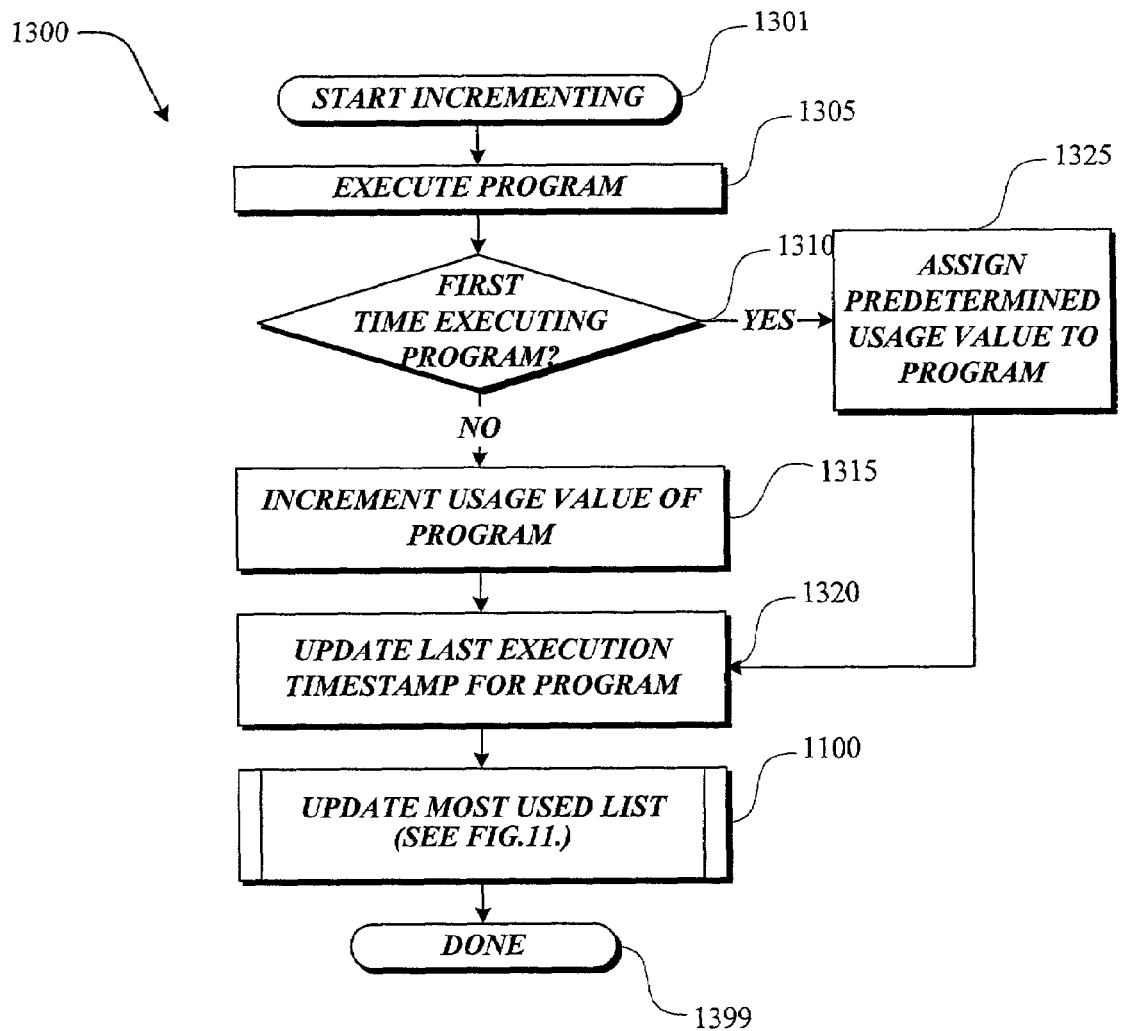
FIG. 13 is a flow diagram illustrating a routine for incrementing program usage formed in accordance with the alternative embodiment of the present invention.

FIG. 13 is very similar to FIG. 7 of the first illustrated embodiment of the present invention. More specifically, FIG. 13 illustrates a process for incrementing usage values when programs are executed. In contrast to routine 700, which increments program execution points, routine 1300 increments program usage values. Routine 1300 begins at block 1301 and proceeds to block 1305 when a program is executed (started) by user interaction with any execution point associated with the program. Then in decision block 1310 a test is made to determine if this is the first time the program has been executed. If this is the first time the program has been executed, in block 1325, a predetermined usage value is assigned to the program. The predetermined usage value increases the prominence of the program in the most used list. As a result, a new program may have a higher prominence in the most used list than older programs that are infrequently used. The predetermined usage value can be any predetermined number based on the operating system developer's desire to increase the prominence of newly executed programs. In one exemplary embodiment the predetermined usage value is selectable from a range of usage values lying between five and ten points. Those of ordinary skill in the art will appreciate that many factors may be taken into consideration by a developer when determining what predetermined usage value should be assigned to newly executed programs. After the predetermined usage value has been assigned (block 1325), processing proceeds to block 1320. If, in decision block 1310, a determination was made that this was not the first time the program was executed, then, in block 1315, the usage value associated with the program is simply incremented. Then processing proceeds to block 1320. In block 1320 the last execution time stamp is updated in the program list 180 to reflect the time the program was most recently executed. Next, the update most used list subroutine 1100 (FIG. 11) is called to update the most used list based on the change in usage value for the executed program. Routine 1300 then ends at block 1399.

Figure 14:
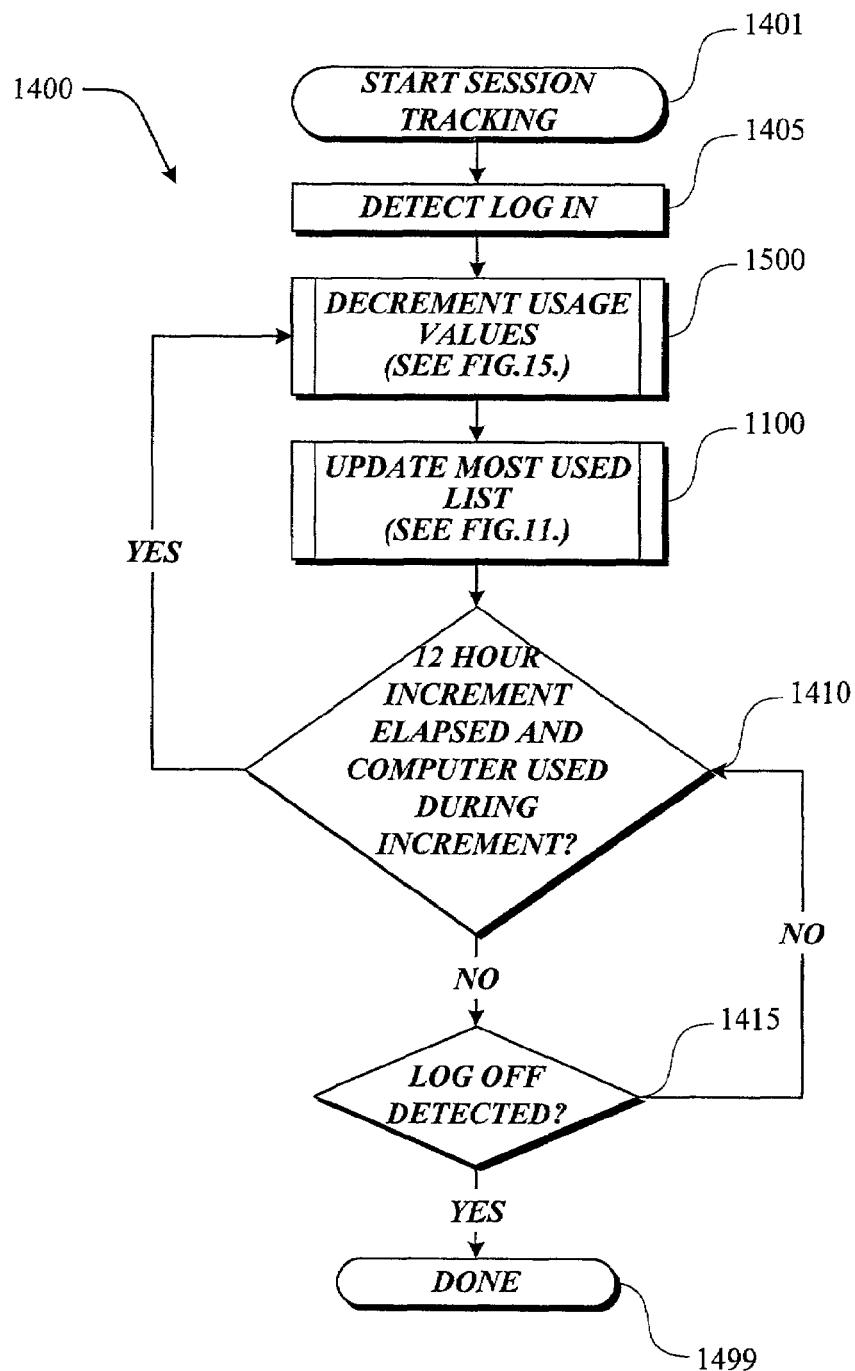
FIG. 14 is a flow diagram illustrating a session tracking routine formed in accordance with the alternative embodiment of the present invention.
Figure 15:
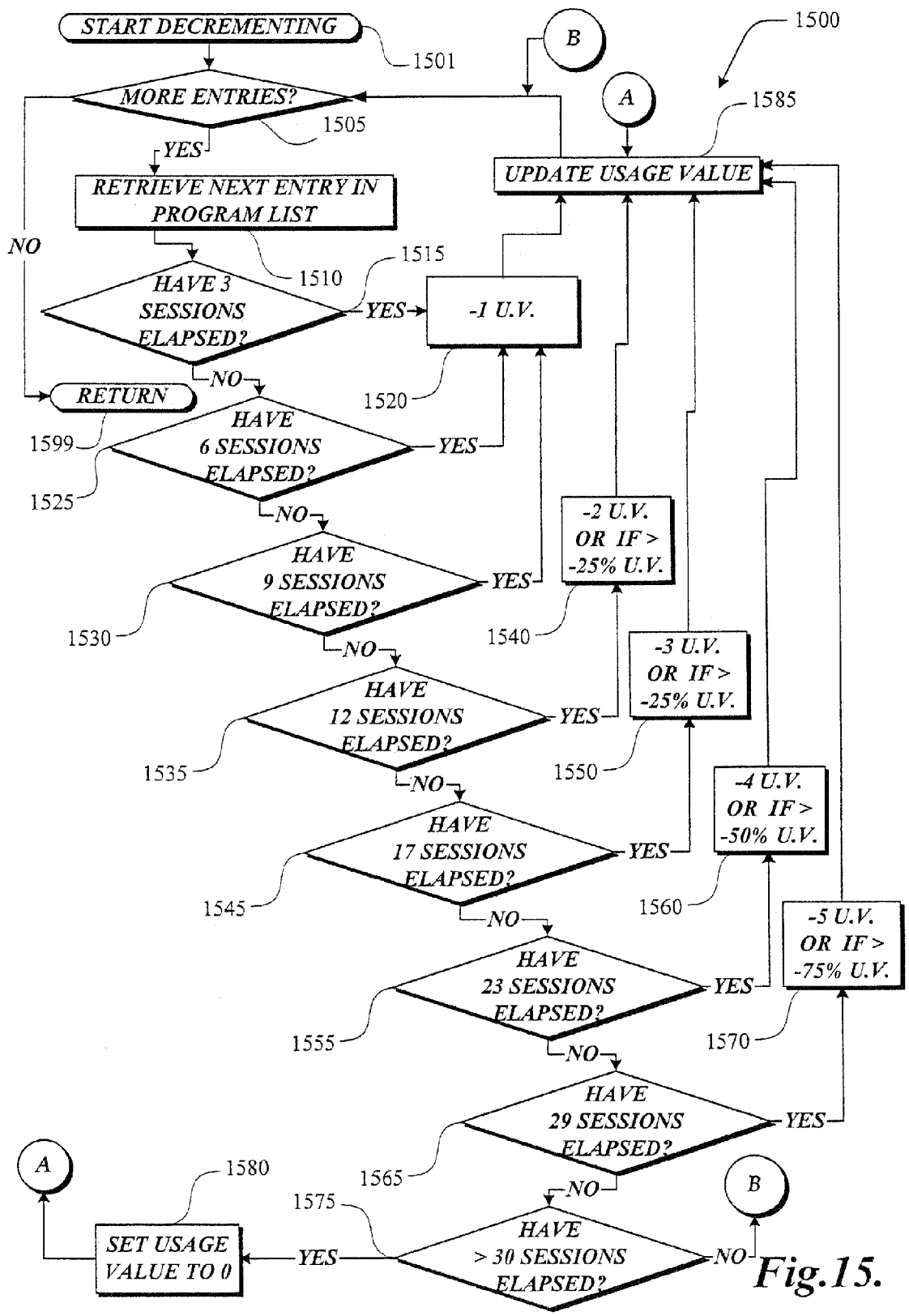
FIG. 15 is a flow diagram illustrating a decrement usage values subroutine suitable for use in the routine illustrated in FIG. 14.

FIG. 14 illustrates a session tracking routine 1400. Routine 1400 begins at block 1401 and proceeds to block 1405 where a computer boot up or login is detected. The boot up or login tells the computer that another computing session has passed and that a decrement usage value subroutine 1500 should be called. Subroutine 1500 is illustrated in FIG. 15 and described in detail below. Once usage values have been decremented during a pass through subroutine 1500, a pass is made through subroutine 1100 (FIG. 11) during which the most used list is updated. After the most used list has been updated, processing proceeds to decision block 1410 where a test is made to determine if a twelve-hour time increment has elapsed and if the computer was used during the time increment. If the computer was used during the twelve-hour time increment a session has elapsed, another pass is made through subroutine 1500 and processing continues from there. If, however, in decision block 1410 it is determined that there was no usage and/or that the twelve-hour time increment has not elapsed, processing proceeds to decision block 1415 where a test is made to determine if a logoff or shut down sequence has been detected. If no logoff or shut down sequence has been detected in decision block 1415, processing loops back to decision block 1410. If a logoff or shut down sequence is detected in decision block 1415, routine 1400 ends in block 1499.

As mentioned above, FIG. 15 illustrates an exemplary usage value decrementing subroutine 1500. Subroutine 1500 begins at block 1501 and proceeds to decision block 1505 where a test is made to determine if there are unexamined (more) entries in the program list. If in decision block 1505 a determination is made that no more entries are available, subroutine 1500 ends at block 1599. Otherwise, processing proceeds to block 1510 where the next entry is retrieved from the program list. After retrieval, the entry is flagged or in some other way marked so that it will not be retrieved again during the present pass through subroutine 1500. Next, in decision block 1515, a test is made to determine if exactly three (3) sessions have elapsed since the program listed in the retrieved entry was last executed. If a determination is made that exactly three sessions have elapsed since the program was last executed, processing continues to block 1520 where one point is removed from the usage value associated with the program. Processing then proceeds to block 1585 where the usage value in the program list associated with the retrieved entry is updated with the new usage value. Processing then returns to decision block 1505.

If in decision block 1515 it was determined that less than or more than three sessions have elapsed (passed) since the last time the program was executed, processing proceeds to decision block 1525 where a test is made to determine if exactly six sessions have elapsed or passed since the program was last executed. If in decision block 1525 a determination is made that exactly six sessions have elapsed, processing cycles through block 1520 and block 1585 where the previously described action takes place before looping back to decision block 1505. Similarly, if in decision block 1525 a determination was made that less than or more than six sessions have elapsed since the last time the program was executed, processing continues to decision block 1530 where a test is made to determine if exactly nine sessions have elapsed or occurred since the last time the program was executed. If exactly nine sessions have elapsed since the last time the program was executed, processing again cycles through blocks 1520 and 1585, looping back to decision block 1505.

If in decision block 1530 a determination was made that less than or more than nine sessions have elapsed since the last time the program was executed, processing continues to decision block 1535 where a test is made to determine if exactly twelve sessions have elapsed since the last time the program was executed. If in decision block 1535 a determination is made that exactly twelve sessions have elapsed, processing proceeds to block 1540 where the greater of two points or 25% of the current usage value is subtracted from the current usage value for the program retrieved from the program list in block 1510. Next, processing proceeds to block 1585 where the usage value of the retrieved program is updated in the program list. Then processing loops back to decision block 1505.

If in decision block 1535 a determination was made that less than or more than twelve sessions have elapsed since the last time the program was executed, processing continues to decision block 1545 where a test is made to determine if exactly seventeen sessions have elapsed or passed since the last time the program was executed. If in decision block 1545 a determination is made that exactly seventeen sessions have lapsed, processing proceeds to block 1550 where the greater of three points or 25% of the current usage value is subtracted from the current usage value. Processing then proceeds to block 1585 where the usage value of the program is updated before looping back to decision block 1505. If in decision block 1545 a determination was made that less than or more than seventeen sessions have elapsed, the subroutine cycles to decision block 1555 where a test is made to determine if exactly twenty-three sessions have elapsed since the last time the program was executed. If in decision block 1555 it is determined that exactly twenty-three sessions have lapsed, processing proceeds to block 1560 where the greater of four points or 50% of the current usage value is subtracted from the program's current usage value. Then the usage value of the program's entry in the program list is updated (block 1585), after which processing loops back to decision block 1505.

If in decision block 1555 it was determined that less than or more than twenty-three sessions have elapsed since the program was last executed, processing proceeds to decision block 1565 where a test is made to determine if exactly twenty-nine sessions have elapsed since the last time the program was executed. If exactly twenty-nine sessions have elapsed, processing proceeds to block 1570 where the greater of five points or 75% of the usage value is subtracted from the program's current usage value. Then, in block 1585, the program's usage value in the program list is updated after which processing loops back to decision block 1505.

If in decision block 1565 it is determined that less than or more than twenty-nine sessions have elapsed sine the last time the program was executed, processing proceeds to decision block 1575 where a test is made to determine if more than thirty sessions have elapsed since the last time the program was executed. If it is determined in decision block 1575 that more than thirty sessions have elapsed or passed since the last time the program was executed, processing proceeds to block 1580 where the usage value of the program is set to zero. Processing then proceeds to block 1585 where the program's usage value is updated in the program list before looping back to decision block 1505. If in decision block 1575 it is determined that less than thirty sessions have elapsed since the last time the program was executed, processing loops directly back to decision block 1505. In this case, the program's usage value is not updated in the program list.

As will be appreciated from the foregoing description, only the elapsing or passing of exact number of sessions—3, 6, 9, 12, etc.—since the last time a program was executed results in a usage value update. The elapsing of other numbers of sessions—1, 2, 4, 5, 7, 8, etc.—does not result in an update. The elapsing or passage of sessions is, of course, determined by testing the program's time stamp, which is updated each time the program is executed as shown in FIG. 13 (block 1320).

FIG. 16 illustrates an exemplary user interface 1600, such as a desktop generated by a computer operating system, such as operating system 146 (FIG. 1). The various user interface components illustrated in FIG. 16 are merely exemplary components used to better illustrate the present invention, and should not be taken as limiting. FIG. 16 includes a start button 1610 that when activated causes a start menu 1615 to be displayed. The illustrated start menu 1615 includes a list of menu options 1620, a most used list 1630, and a pinned program list 1640. The start menu may also be an access point for activating a program menu 1650 that includes a list of program execution points. Additionally, the user interface 1600 may include other interface components, such as a status bar 1605 that may include other execution points, such as status bar icons 1670a, 1670b, and 1670c. The user interface 1600 may include further execution points, such as icons 1660a, 1660b, and 1660c located on the desktop itself. Those of ordinary skill in the art will appreciate that this is a simplified view of one exemplary user interface and that many other forms of user interfaces or arrangements of a user interface may be used without departing from the spirit and scope of the present invention.

Figure 17:
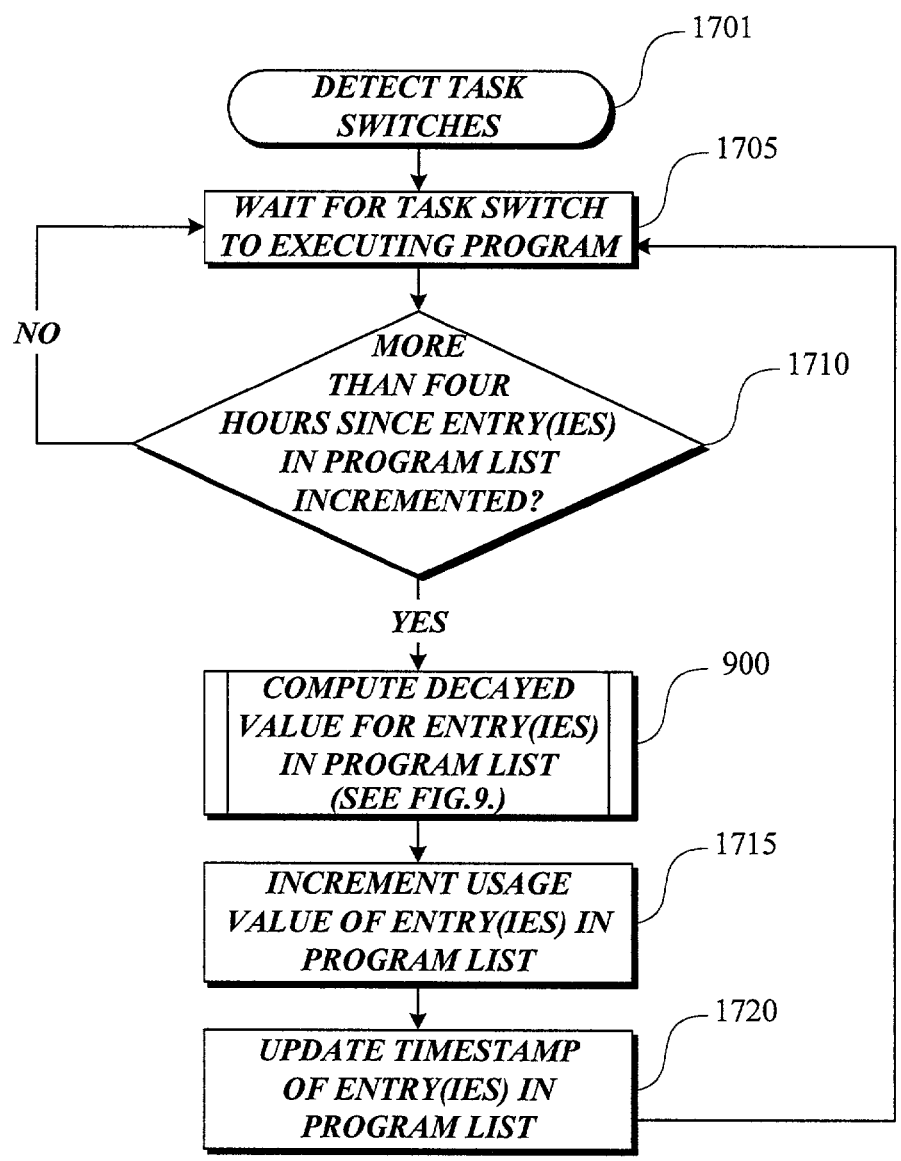
FIG. 17 is a flow diagram illustrating a routine for incrementing a usage value for long running programs in accordance with the present invention.

FIG. 17 illustrates a routine for incrementing usage values for long running programs in accordance with an exemplary embodiment of the present invention. This routine 1700 runs in the background while there are active programs executing in an operating environment compatible with the present invention. Routine 1700 begins in block 1701 and proceeds to block 1705 where the routine waits for a task switch to an executing program that has been in the "background." Once a task switch has been detected, such that the background application is now brought to the foreground and is an active program, then processing continues to decision block 1710 where a determination is made whether more than four hours have elapsed since an entry related to this executing program has been incremented in the program list 180. Entries in the program list 180 that are related to this program are the execution point that was used to start the program and the entry for the program itself in the program list 180. Of course, it will be appreciated by one of ordinary skill in the art that if the program was executed directly without the use of another execution point, that only a single entry in the program list 180 would be effected. If in decision block 1710 a determination was made that four hours has not elapsed since any of the related entries in the program list 180 were incremented, then processing continues back to block 1705, which waits for another task switch to an executing program. If, however, in decision block 1710 a determination was made that more than four hours have elapsed since related entries in the program list 180 were incremented, then processing continues to subroutine block 1900 where a decayed value for the entry or entries in the program list 180 is computed. Subroutine at 900 is described in detail above. Next in block 1715, the usage values of the related entries in the program list 180 are incremented. Then in block 1720 the timestamp for the entry or entries in the program list 180 are also updated. Processing then continues back to block 1705 where routine 1700 waits for another task switch to an executing program.

While the preferred embodiment of the invention has been illustrated and described, it will be appreciated that various changes can be made therein without departing from the spirit and scope of the invention.

The invention claimed is:

1. A computerized method of depicting a list of most used executable programs, comprising:
   determining an executable program list made up only of eligible executable programs previously directly executed by a user;
   tracking the frequency of execution of the executable programs in said executable program list by incrementing a frequency of execution value corresponding to an eligible executable program in said executable program list upon determining that a task switch has made said executable program active and a predetermined time period has elapsed since said frequency of execution value has been incremented;
   determining which executable programs in said executable program list have been executed most frequently; and
   depicting a predetermined number of said executable programs that have been executed most frequently in a most used list.

2. The method of claim 1 wherein said list of eligible executable programs does not include executable programs included in an exclusion list.

3. The method of claim 1 wherein said list of eligible executable programs does not include executable programs included in a pinned list.

4. The method of claim 1 wherein determining which executable programs in said executable program list have been executed most frequently is calculated substantially contemporaneously with the receipt of a request to depict the list of most used executable programs.

5. The method of claim 1 wherein determining which executable programs in said executable program list have been executed most frequently is calculated periodically.

6. The method of claim 1 wherein determining which executable programs in said executable program list have been executed most frequently is calculated when the frequency of execution value of any valid executable program changes.

7. The method of claim 1 wherein said executable program list tracks the frequency of execution on a per user basis.

8. The method of claim 1 further comprising at least one additional executable program list, each executable program list tracking the frequency of execution of executable programs by a particular user.

9. The method of claim 1 wherein tracking the frequency of execution of eligible executable programs comprises incrementing the frequency of execution value corresponding to each eligible executable program in said executable program list each time said eligible executable program is executed.

10. The method of claim 9 wherein the frequency of execution value on said executable program list is periodically decremented if the related executable program has not been used.

11. The method of claim 9 wherein said eligible executable programs may have a plurality of corresponding frequency of execution values each associated with a link to the related eligible executable program.

12. The method of claim 11 further comprising determining a total frequency of execution value for each executable program and storing the total frequency of execution value in a usage list by summing the frequency of execution values for all links to a related executable program in said executable program list.

13. The method of claim 12 wherein determining which executable programs in said usage list have the most usage comprises determining which executable programs in said usage list have the highest total frequency of execution values.

14. The method of claim 13 wherein if a plurality of executable programs in said usage list have the same total frequency of execution value, sorting said plurality of executable programs into chronological order based on the most recently used of said plurality of executable programs.

15. The method of claim 9 further comprising setting a time stamp corresponding to the date and time said eligible executable program was last executed.

16. The method of claim 15 further comprising decrementing the frequency of execution value for said eligible executable program after a predetermined interval of non-usage of said eligible executable program has elapsed.

17. The method of claim 16 wherein said interval is calculated in sessions and said time stamp determines the last session during which said eligible executable program was last executed.

18. The method of claim 17 further comprising deducting one from the corresponding frequency of execution value when more than two sessions have elapsed since said eligible executable program was last executed.

19. The method of claim 18 further comprising deducting one from the corresponding frequency of execution value when more than five sessions have elapsed since said eligible executable program was last executed.

20. The method of claim 19 further comprising deducting one from the corresponding frequency of execution value when more than eight sessions have elapsed since said eligible executable program was last executed,.

21. The method of claim 20 further comprising deducting the greater of two or 25% of the corresponding frequency of execution value when more than eleven sessions have elapsed since said eligible executable program was last executed.

22. The method of claim 21 further comprising deducting the greater of three or 25% of the corresponding frequency of execution value when more than sixteen sessions have elapsed since said eligible executable program was last executed.

23. The method of claim 22 further comprising deducting the greater of four or 50% of the corresponding frequency of execution value when more than twenty-two sessions have elapsed since said eligible executable program was last executed.

24. The method of claim 23 further comprising deducting the greater of five or 75% of the corresponding frequency of execution value when more than twenty-eight sessions have elapsed since said eligible executable program was last executed.

25. The method of claim 17 further comprising setting the corresponding frequency of execution value to zero when more than thirty sessions have elapsed since said eligible executable program was last executed.

26. The method of claim 1 wherein said predetermined time period is in the range of 1-10 hours.

27. A computer system with a depiction device operative to depict a list of most used computer executable programs by:
   determining an executable program list made up only of eligible executable programs previously directly executed by a user;
   tracking the frequency of execution of said executable programs in said executable program list by incrementing a frequency of execution value corresponding to an eligible executable program in said executable program list upon determining that a task switch has made said executable program active and a predetermined time period has elapsed since said frequency of execution value has been incremented;
   determining which executable programs in said executable program list have been executed most frequently; and
   depicting a predetermined number of said executable programs in a most used list on the depiction device.

28. The system of claim 27 wherein said list of eligible executable programs does not include executable programs included in an exclusion list.

29. The system of claim 27 wherein said list of eligible executable programs does not include executable programs included in a pinned list.

30. The system of claim 27 wherein determining which executable programs in said executable program list have been executed most frequently is calculated substantially contemporaneously with the receipt of a request to depict the list of most used executable programs on the depiction device.

31. The system of claim 27 wherein determining which executable programs in said executable program list have been executed most frequently is calculated periodically.

32. The system of claim 27 wherein determining which executable programs in said executable program list have been executed most frequently is calculated when the frequency of execution value of any eligible executable program changes.

33. The system of claim 27 wherein said executable program list tracks frequency of execution on a per user basis.

34. The system of claim 27 further operative to determine at least one additional executable program list, each executable program list tracking the frequency of execution of executable programs by a particular user.

35. The system of claim 27 wherein tracking the frequency of execution of eligible executable programs comprises incrementing the frequency of execution value corresponding to each eligible executable program in said executable program list each time said eligible executable program is executed.

36. The system of claim 35 wherein the frequency of execution value on said executable program list is periodically decremented if the related executable program has not been used.

37. The system of claim 35 wherein said eligible executable programs may have a plurality of corresponding frequency of execution values each associated with a link to the related eligible executable programs.

38. The system of claim 37 further operative to determine a total frequency of execution value for each executable program and storing the total frequency of execution values in a usage list by summing the frequency of execution values for all links to a related eligible executable program.

39. The system of claim 38 wherein determining which executable programs in said usage list have been executed most frequently comprises determining which executable programs in said usage list have the highest total frequency of execution values.

40. The system of claim 39 wherein if a plurality of executable programs in said usage list have the same total frequency of execution value, sorting said plurality of executable programs into chronological order based on the most recently used of said plurality of executable programs.

41. The system of claim 35 further operative to set a time stamp corresponding to the date and time said eligible executable program was last executed.

42. The system of claim 41 further operative to decrement the frequency of execution value for said eligible executable program after a predetermined interval of non-usage of said eligible executable program has elapsed.

43. The system of claim 42 wherein said interval is calculated in sessions and said time stamp determines the last session during which said eligible executable program was last executed.

44. The system of claim 43 further operative to deduct one from the corresponding frequency of execution value when more than two sessions have elapsed since said eligible executable program was last executed.

45. The system of claim 44 further operative to deduct one from the corresponding frequency of execution value when more than five sessions have elapsed since said eligible executable program was last executed.

46. The system of claim 45 further operative to deduct one from the corresponding frequency of execution value when more than eight sessions have elapsed since said eligible executable program was last executed.

47. The system of claim 46 further operative to deduct the greater of two or 25% of the corresponding frequency of execution value when more than eleven sessions have elapsed since said eligible executable program was last executed.

48. The system of claim 47 further operative to deduct the greater of three or 25% of the corresponding frequency of execution value when more than sixteen sessions have elapsed since said eligible executable program was last executed.

49. The system of claim 48 further operative to deduct the greater of four or 50% of the corresponding frequency of execution value when more than twenty-two sessions have elapsed since said eligible executable program was last executed.

50. The system of claim 49 further operative to deduct the greater of five or 75% of the corresponding frequency of execution value when more than twenty-eight sessions have elapsed since said eligible executable program was last executed.

51. The system of claim 43 further operative to set the corresponding frequency of execution value to zero when more than thirty sessions have elapsed since said eligible executable program was last executed.

52. The system of claim 27 wherein tracking the frequency of execution of eligible executable programs comprises incrementing a frequency of execution value corresponding to an eligible executable program in said executable program list upon determining that a task switch has made said executable program active and a predetermined time period has elapsed since said frequency of execution value has been incremented.

53. A computer readable medium containing computer executable code for depicting a list of most used executable programs by:
  determining an executable program list of eligible executable programs previously directly executed by a user;
  tracking the frequency of execution of said executable programs in said executable program list by incrementing a frequency of execution value corresponding to an eligible executable program in said executable program list upon determining that a task switch has made said executable program active and a predetermined time period has elapsed since said frequency of execution value has been incremented;
  determining which executable programs in said executable program list have been executed most frequently; and
  depicting a predetermined number of said executable programs that have been executed most frequently in a most used list.

54. The computer readable medium of claim 53 wherein said list of eligible executable programs does not include executable programs included in an exclusion list.

55. The computer readable medium of claim 53 wherein said list of eligible executable programs does not include executable programs included in a pinned list.

56. The computer readable medium of claim 53 wherein determining which executable programs in said executable program list have been executed most frequently is calculated substantially contemporaneously with the receipt of a request to depict the list of most used executable programs.

57. The computer readable medium of claim 53 wherein determining which executable programs in said executable program list have been executed most frequently is calculated periodically.

58. The computer readable medium of claim 53 wherein determining which executable programs in said executable program list have been executed most frequently is calculated when the frequency of execution value of any eligible executable program changes.

59. The computer readable medium of claim 53 wherein said executable program list tracks frequency of execution on a per user basis.

60. The computer readable medium of claim 53 further comprising at least one additional executable program list, each executable program list tracking the frequency of execution of executable programs by a particular user.

61. The computer readable medium of claim 53 wherein tracking the frequency of execution of eligible executable programs comprises incrementing the frequency of execution value corresponding to each eligible executable program in said executable program list each time said eligible executable program is executed.

62. The computer readable medium of claim 61 wherein the frequency of execution value on said executable program list is periodically decremented if the related executable program has not been used.

63. The computer readable medium of claim 61 wherein said eligible executable programs may have a plurality of corresponding frequency of execution values each associated with a link to the related eligible executable programs.

64. The computer readable medium of claim 63 further comprising determining a total frequency of execution value for each executable program and storing the total frequency of execution value in a usage list by summing the frequency of execution values for all links to a related eligible executable program.

65. The computer readable medium of claim 64 wherein determining which executable programs in said usage list have been executed most frequently comprises determining which executable programs in said usage list have the highest total frequency of execution values.

66. The computer readable medium of claim 65 wherein if a plurality of executable programs in said usage list have the same total frequency of execution value, sorting said plurality of executable programs into chronological order based on the most recently used of said plurality of executable programs.

67. The computer readable medium of claim 61 further comprising setting a time stamp corresponding to the date and time said eligible executable program was last executed.

68. The computer readable medium of claim 67 further comprising decrementing the frequency of execution value for said eligible executable program after a predetermined interval of non-usage of said eligible executable program has elapsed.

69. The computer readable medium of claim 68 wherein said interval is calculated in sessions and said time stamp determines the last session during which said eligible executable program was last executed.

70. The computer readable medium of claim 69 further comprising deducting one from the corresponding frequency of execution value when more than two sessions have elapsed since said eligible executable program was last executed.

71. The computer readable medium of claim 70 further comprising deducting one from the corresponding frequency of execution value when more than five sessions have elapsed since said eligible executable program was last executed.

72. The computer readable medium of claim 71 further comprising deducting one from the corresponding frequency of execution value when more than eight sessions have elapsed since said eligible executable program was last executed.

73. The computer readable medium of claim 72 further comprising deducting the greater of two or 25% of the corresponding frequency of execution value when more than eleven sessions have elapsed since said eligible executable program was last executed.

74. The computer readable medium of claim 73 further comprising deducting the greater of three or 25% of the corresponding frequency of execution value when more than sixteen sessions have elapsed since said eligible executable program was last executed.

75. The computer readable medium of claim 74 further comprising deducting the greater of four or 50% of the corresponding frequency of execution value when more than twenty-two sessions have elapsed since said eligible executable program was last executed.

76. The computer readable medium of claim 75 further comprising deducting the greater of five or 75% of the corresponding frequency of execution value when more than twenty-eight sessions have elapsed since said eligible executable program was last executed.

77. The computer readable medium of claim 69 further comprising setting the corresponding frequency of execution value to zero when more than thirty sessions have elapsed since said eligible executable program was last executed.

78. The computer-readable medium of claim 53 wherein tracking the frequency of execution of eligible executable programs comprises incrementing a frequency of execution value corresponding to an eligible executable program in said executable program list upon determining that a task switch has made said executable program active and a predetermined time period has elapsed since said frequency of execution value has been incremented.

* * * * *